United States Patent
Chen et al.

(10) Patent No.: US 11,419,005 B2
(45) Date of Patent: Aug. 16, 2022

(54) METHOD AND NODE FOR DECODING OR ENCODING USER DATA BASED ON A JOINT TBS INDEX AND REDUNDANT VERSION

(71) Applicant: TELEFONAKTIEBOLAGET LM ERICSSON (PUBL), Stockholm (SE)

(72) Inventors: Xixian Chen, Ottawa (CA); Jun Wang, Kanata (CA); James Jianfeng Weng, Kanata (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/620,176

(22) PCT Filed: Jun. 6, 2018

(86) PCT No.: PCT/IB2018/054335
§ 371 (c)(1),
(2) Date: Dec. 6, 2019

(87) PCT Pub. No.: WO2018/229691
PCT Pub. Date: Dec. 20, 2018

(65) Prior Publication Data
US 2021/0084532 A1  Mar. 18, 2021

Related U.S. Application Data

(60) Provisional application No. 62/581,371, filed on Nov. 3, 2017, provisional application No. 62/520,934, filed (Continued)

(51) Int. Cl.
*H04J 1/16* (2006.01)
*H04J 3/14* (2006.01)
(Continued)

(52) U.S. Cl.
CPC .......... *H04W 28/06* (2013.01); *H04L 5/0048* (2013.01); *H04W 72/04* (2013.01)

(58) Field of Classification Search
CPC ...... H04W 28/06; H04W 72/04; H04L 5/0048
(Continued)

(56) References Cited

U.S. PATENT DOCUMENTS

2010/0041408 A1* 2/2010 Caire ................... H04L 5/0007
455/446
2010/0195614 A1 8/2010 Nimbalker
(Continued)

FOREIGN PATENT DOCUMENTS

EP          2541796 A2     2/2013

OTHER PUBLICATIONS

Ericsson: "On MCS/transport Block Size Determination for PUSCH", 3GPP Draft; RI-17096096, 3rd Generation Partnership Project (3GPP), Mobile Competence Centre ; 650, Route Des Lucioles ; F-06921 Sophia-Antipolis Cedex; France; vol. RAN WGI, no. Hangzhou, China; 20170515-20170519; May 14, 2017 (May 14, 2017), XP051274254,Retrieved from the Internet: URL:http://www.3gpp.org/ftp/Meetings 3GPP SYNC/RANI/Doc[retrieved on May 14, 2017] the whole document.
(Continued)

*Primary Examiner* — Maharishi V Khirodhar
(74) *Attorney, Agent, or Firm* — Sage Patent Group

(57) ABSTRACT

There is provided a method performed by a wireless device for handling user data, wherein the user data are converted into codewords, each codeword having a first group of layers and a second group of layers. The method comprises: receiving an index from a network node, the index indicating a Transport Block Size (TBS) index, a Redundant Version (RV) and a differential modulation; determining a TBS based on the received index; determining a redundant ver-
(Continued)

sion value based on the received index; determining a first modulation order for the first group and a second modulation order for the second group of a codeword, based on the differential modulation; and performing one of decoding and encoding the codeword based at least on the determined first and second modulation orders, the determined TBS and the determined redundant version value.

20 Claims, 16 Drawing Sheets

Related U.S. Application Data on Jun. 16, 2017, provisional application No. 62/520,914, filed on Jun. 16, 2017.

(51) Int. Cl.
  *H04W 28/06* (2009.01)
  *H04L 5/00* (2006.01)
  *H04W 72/04* (2009.01)

(58) Field of Classification Search
  USPC .......................................................... 370/230
  See application file for complete search history.

(56) References Cited

U.S. PATENT DOCUMENTS

| | | | | |
|---|---|---|---|---|
| 2010/0202561 | A1* | 8/2010 | Gorokhov | H04L 27/36 375/295 |
| 2013/0070624 | A1* | 3/2013 | Nguyen | H04W 24/08 370/252 |
| 2014/0313985 | A1* | 10/2014 | Nimbalker | H04L 1/0061 370/329 |
| 2015/0271802 | A1 | 9/2015 | Kang | |
| 2018/0262382 | A1* | 9/2018 | Manolakos | H04L 1/0033 |
| 2018/0324007 | A1* | 11/2018 | Nammi | H04B 7/0626 |

OTHER PUBLICATIONS

Motorola: "PDCCH Scheduiing Assignment Field Definition (MCS, RV, NDI)",3GPP Draft; Rl-080436—PDCCH SA Field Definition (MCS RV NDI), 3rd Generation Partnership Project (3GPP), Mobile Competence Centre ; 650, Route Des Lucioiles ; F-06921 Sophia-Antipolis Cedex; France, vol. RAN WGl, no. Sevilla, Spain; Jan. 19, 2008, Jan. 19, 2008 (Jan. 1, 2008), XP050108955,[retrieved on Jan. 19, 2008] Section 2 and Annex B.

Gabry, Fredric: "International Search Report: PCT/IB2018/054335"; European Patent Office, The Netherlands, Sep. 10, 2018.

3GPP, "3rd Generation Partnership Project; Technical Specification Group Radio Access Network; Evolved Universal Terrestrial Radio Access (E-UTRA); Physical layer procedures (Release 10)", TS 36.213 V10.9.0, Feb. 2013.

3GPP, "3rd Generation Partnership Project; Technical Specification Group Radio Access Network; NR; Physical layer procedures for control (Release 15)", TS 38.213 V1.0.0, Sep. 2017.

Gabry, Frederic, Communication pursuant to Article 94(3)EPC, EPO Application No. 18737994.6, Munich, Germany, Oct. 20, 2021.

* cited by examiner

METHOD AND NODE FOR DECODING OR ENCODING USER DATA BASED ON A JOINT TBS INDEX AND REDUNDANT VERSION

RELATED APPLICATIONS

The present application claims the benefits of priority of U.S. Provisional Patent Application No. 62/581,371, entitled "TBS and Modulation Order determination for 5G NR", and filed at the United States Patent and Trademark Office on Nov. 3, 2017. The present application also claims the benefits of priority of U.S. Provisional No. 62/520,934, entitled "TBS and Modulation Order determination for 5G NR" and filed at the United States Patent and Trademark Office on Jun. 16, 2017, and of U.S. Provisional No. 62/520,914, entitled "A new method to support different modulations within one codeword in 5G NR", and filed at the United States Patent and Trademark Office on Jun. 16, 2017. The content of these three provisional applications is incorporated herein by reference.

TECHNICAL FIELD

The present description generally relates to wireless communication networks and more particularly to decoding or encoding user data based on a jointly coded Transport Block Size index and Redundant Version.

BACKGROUND

3GPP has now started its journey towards 5G NR (New Radio), and there are quite a large number of areas where improvements over Long Term Evolution (LTE) can be made.

In LTE, the modulation and coding schemes are selected jointly. Scheduler and link adaptation work together to decide the number of scheduling blocks (SBs) to be allocated and the modulation, based on which, the Transport Block (TB) size, modulation and coding scheme (MCS) are determined by looking up a predefined table in 3GPP TS 36.213, given an estimation of the prevailing link quality and the amount of data desired to be transmitted in a given Transmission Time Interval (TTI). Although the table-driven lookup is straightforward, this process introduces unnecessary constraints by bundling two independent concepts, i.e. the TB size and modulation, together. For example, lower TB size results in lower modulation order, which cannot fully utilize higher channel quality when some Resource Elements (REs) within one SB are reserved for other purpose, such as DeModulation Reference Signal (DMRS).

To decouple the TB size from the modulation, an existing solution proposes to have a smaller table (see below) for the modulation and coding scheme (MCS).

TABLE 1

MCS index, modulation order and code rate table for PDSCH

| MCS Index $I_{MCS}$ | Modulation Order $Q_m$ | Code Rate R × 1024 |
| --- | --- | --- |
| 0 | 2 | 120 |
| 1 | 2 | 193 |
| 2 | 2 | 308 |
| 3 | 2 | 449 |
| 4 | 2 | 602 |
| 5 | 4 | 378 |
| 6 | 4 | 434 |
| 7 | 4 | 490 |
| 8 | 4 | 553 |
| 9 | 4 | 616 |
| 10 | 4 | 658 |
| 11 | 6 | 466 |
| 12 | 6 | 517 |
| 13 | 6 | 567 |
| 14 | 6 | 616 |
| 15 | 6 | 666 |
| 16 | 6 | 719 |
| 17 | 6 | 772 |
| 18 | 6 | 822 |
| 19 | 6 | 873 |
| 20 | 8 | 682.5 |
| 21 | 8 | 711 |
| 22 | 8 | 754 |
| 23 | 8 | 797 |
| 24 | 8 | 841 |
| 25 | 8 | 885 |
| 26 | 8 | 916.5 |
| 27 | 8 | 948 |
| 28 | 2 | Reserved for modulation in retransmission |
| 29 | 4 | |
| 30 | 6 | |
| 31 | 8 | |

The User Equipment (UE) shall use the MCS index and Table 1 to determine the modulation order and code rate for the physical downlink shared channel.

Denote $N_{RE}^{PRB}$ as the nominal number of resource elements per Physical Resource Block (PRB) in the PRBs allocated for Physical Downlink Shared Channel (PDSCH), i.e., a predefined number of resource elements per PRB. For example, a nominal PRB is a logic resource concept with a predefined number of resource elements (REs), e.g. 128 or 64, whereas the physical PRB is a real resource block.

Denote $L^{DL}$ as the number of layers the codeword is mapped to, after the transport block is encoded into the codeword. The transport block size (TBS) in bits is determined by:

$$TBS = 8 \times \left\lceil \frac{N_{PRB}^{DL} \times N_{RE}^{PRB} \times L^{DL} \times M \times R_{coding}}{8} \right\rceil \quad (1)$$

Where $N_{PRB}^{DL}$ denotes the number of PRBs allocated to a wireless device (for example), $N_{RE}^{PRB}$ denotes the RE number within one PRB, M stands for the modulation order, and $R_{coding}$ stands for the code rate.

Note, in Table 1, that MCS indexes from 0 to 27 are used for a new transmission or DTXed re-transmission, which means that RV0 is missing at the wireless device. Also, a DTXed re-transmission means a retransmission due to a discontinued transmission of the original transmission when the UE failed to decode the DCI transmitted on the PDCCH. MCS indexes from 28 to 31 are used for a re-transmission, which only contain modulation order information, since the UE already knows the TBS from the original transmission.

Both LTE and 5G NR use a clever algorithm to implement incremental redundancy and adaptive coding. The coded bits are interleaved and placed into a circular buffer called the soft buffer. Bits are copied from the buffer starting at a position that depends on the redundant version (RV). The starting position for $RV_n$ is approximately n/4 of the way around the circular buffer. The number of bits pulled from the circular buffer for each RV depends on the target code rate. For poor channel conditions, the code rate approaches 0.1, in which case the entire soft buffer is transmitted multiple times in each RV. In excellent channel conditions, the code rate approaches 0.92, which means the number of bits transmitted in each RV is slightly more than the number of bits in the transport block.

Redundant version 0 is often used for the initial transmission. If a NACK is received from the UE, other Redundant versions can be used for re-transmission to enable the UE to implement incremental redundancy and thus improve the decoding performance.

There were two provisional applications filed targeted to TBS and modulation as well as support of different modulations among multiple layers within one codeword in 5G NR.

1) TBS and Modulation Order determination for 5G NR (P71851, 62/520934, filed on Jun. 16, 2017) and referred to as Reference 1. Reference 1 provides a new TBS-centric method to determine TBS and modulation in new transmissions and retransmissions, which decouples the existing coupling constraint between TBS and modulation.

2) A new method to support different modulations within one codeword in 5G NR (P71930, 62/520914, filed on Jun. 16, 2017) and referred to as Reference 2. Reference 2 provides a new method to support different modulations among two groups of layers within one codeword, which allows a 5gNB (base station of a 5G network) to serve the diversity of channels better in 5g NR.

SUMMARY

There currently exist certain challenge(s).

Both LTE and the proposed 5G standard use five bits to represent the MCS index, and another two bits to indicate 4 different redundant versions (RV0, RV1, RV2, and RV3). Such a separate encoding actually constructs four independent and symmetric value spaces for a new transmission and retransmission (RV0/1/2/3) respectively (each has $2^5$=32 values). Unfortunately, this is not an ideal way to fully utilize these 7 bits, since the new transmission has different requirements from the retransmission. Note that for a new transmission with RV0, MCS (5 bits) is used to indicate the TB size to a UE as accurate as possible. But for a retransmission with RV1/2/3, the UE knows already the TB size from the new transmission, then it only needs to know the RV number (RV1/2/3) and the modulation order (QPSK, 16QAM, 64QAM or 256QAM), i.e., 3×4=12 values are enough. That means that the 5-bit MCS is not fully utilized during the retransmission. The existing solutions (both LTE and proposed 5G) introduce the following drawbacks:

1) Magnified Quantization Error

Due to the air channel constraint, it's impossible to indicate to the UE the actual TB size or efficiency directly, which needs at least 16 bits. Instead, the TB size or efficiency is quantized into several levels, among which the most appropriate one is chosen. The index of the chosen TBS is notified to the UE. Inevitably, there is quantization error, e.g. the larger is the TB size, the larger is the quantization error.

However, due to the number of bit values assigned to a retransmission, only 5-bit MCS can be used in a new transmission. The 5-bit MCS can represent at most 32 levels (0-31), among which the larger values (28-31) are reserved for retransmissions. As such, only 28 levels can be used to indicate the TBS or efficiency levels of a new transmission, which further may magnify the TBS quantization error, especially for large numbers of allocated PRBs according to formula (1).

Furthermore, the supported modulation order directly contributes to the quantization error. If more new modulations are introduced in the future, more values have to be reserved out of the valid ones. As such, the quantization error will be increased.

2. No Support of Different Channel Qualities Among Different Layers

Since the DCI has no extra bits to indicate channel condition/quality differences among different layers, the existing solutions have to assume that all layers within one codeword have the same channel quality and share the same modulation and code rate. However, it's not true in real situations. Such an assumption either impacts the throughput, by aligning all the layers in a TB to the lower modulation order, or suffers from the potential BLER, by aligning all the layers in a TB to the higher modulation order.

To support different channel qualities among the multiple layers, the existing solutions have to introduce more fields in the DCI to indicate the additional modulation order parameter for different layers, which would lead to increase the DCI size and impact the PDCCH reception success rate.

An ideal solution should decrease the quantization error to its minimum extent by fully utilizing the existing 5 bits and support different modulation orders among the different layers in both new transmission and retransmission without increasing the DCI size.

Although the proposed table 1 is smaller than the existing 3GPP 36.213 TB size table, it imposes another assumption on the TB size calculation (formula 1), i.e., the TB size is linearly proportional to the number of PRBs. This assumption is not true in the real sites, especially for large numbers of PRBs. FIG. 1 shows the relation between the TBS and PRB number, in which a linear area 100 and a non-linear area 102 are illustrated.

From FIG. 1, it can be clearly seen that only when the allocated PRB number is small (<30), the relation can be approximately recognized as a line (or linear). However, with more PRBs allocated, the relation clearly deviates from the line. In 5G, to support higher throughput, the PRB allocation number for each UE is relatively larger than that in LTE. Then, the non-linearity will become unneglectable. So, the TBS in formula 1 not only throws away the existing TBS decision flexibility, but also introduces transmission BLER, especially for the large PRB allocation case. On the other hand, once decoupling the TB size and modulation, the existing TBS table is not only more straightforward, but also provides the independent TBS decision for any PRB allocation number, so it's more appropriate for 5G where the memory consumption limitation in a device has disappeared.

Certain aspects of the present disclosure and their embodiments may provide solutions to these or other challenges.

For example, some embodiments provide a joint coding scheme by combining the 5 bits for indicating the TBS Index (TBSI) and the 2 bits for indicating the RV together to provide a single index, referred to as the TBSRV index. The joint coding scheme not only increases the TB size levels from the existing 28 to 31 and as such the TBS quantization error is minimized, but also supports channel quality diversity among the different layers. The joint coding scheme also allows the overlapping between the TBSRV index for a new transmission and Redundant Version for a retransmission based on the negligible ambiguity probability ($10^{-10}$).

Some embodiments provide a differential coding scheme of modulation orders for two groups of layers, which support different modulations between the two groups of layers in both a new transmission and retransmission, without increasing the DCI size.

Some embodiments provide a DMRS-based blind detection mechanism that enables the UE to determine by itself each group's layer number.

Based on the differential coding of modulation and DMRS-based blind detection, a sliding window algorithm can simultaneously determine the modulation orders for two groups of layers in a very efficient way (based on the offline-calculated average efficiency table). Based on the layer number and modulation order of each group as well as the RV derived from the joint coding scheme, the existing Hybrid Automatic Repeat request (HARQ) incremental soft combing can be applied.

Certain embodiments may provide one or more of the following technical advantage(s).

Compared with the existing LTE standard and 5G proposal, the embodiments of the present disclosure have the following advantages:

1. Larger TBS Levels and Support of Channel Diversity Among Layers Using the Existing Bits In addition to increasing the TBS levels for a new transmission from 28 to 31, the embodiments remove all constraints imposed by the prior art and provides a solution which can be applied in all kinds of 5g NR scenarios (good or bad channel quality, fast or slow moving terminals, etc.). Furthermore, they support any modulations and coding rates between two groups of layers within one codeword. They also support channel diversity in both the new transmission and retransmission without increasing the DCI size.

2. Flexibility of Independent TBS and Modulation Decision for any PRB Number

After decoupling the TB size from the modulation, the new TBS table only represents the TB size levels and has nothing to do with the modulation so that the scheduler in the network node can independently determine the TB size and corresponding modulation for any PRB number. As such, the real channel quality can be fully utilized.

Also, the embodiments herein allow to remove the assumption of the implicit linear relationship provided by formula 1. As such, they provide a flexible TBS decision for any PRB number.

According to one aspect, some embodiments include a method performed by a wireless device for handling user data, wherein the user data are converted into codewords, each codeword having a first group of layers and a second group of layers. The method generally comprises: receiving an index from a network node, the index indicating a Transport Block Size (TBS) index, a Redundant Version (RV) and a differential modulation; determining a TBS based on the received index; determining a redundant version value based on the received index; determining a first modulation order for the first group of layers and a second modulation order for the second group of layers of a codeword, based at least on the differential modulation; performing one of decoding and encoding the codeword based at least on the determined first and second modulation orders, the determined TBS and the determined redundant version value.

According to another aspect, some embodiments include a wireless device configured, or operable, to perform one or more functionalities (e.g. actions, operations, steps, etc.) of the wireless device as described herein.

In some embodiments, the wireless device may comprise one or more communication interfaces configured to communicate with one or more other radio nodes and/or with one or more network nodes, and processing circuitry operatively connected to the communication interface, the processing circuitry being configured to perform one or more functionalities as described herein. In some embodiments, the processing circuitry may comprise at least one processor and at least one memory storing instructions which, upon being executed by the processor, configure the at least one processor to perform one or more functionalities as described herein.

In some embodiments, the wireless device may comprise one or more functional modules configured to perform one or more functionalities as described herein.

According to another aspect, some embodiments include a non-transitory computer-readable medium storing a computer program product comprising instructions which, upon being executed by processing circuitry (e.g., at least one processor) of the wireless device, configure the processing circuitry to perform one or more functionalities as described herein.

According to another aspect, some embodiments include a method performed by a base station for allocating resources for a transmission of user data to a wireless device, the user data being converted into a codeword having a first group of layers and a second group of layers. The method generally comprises: determining the resources to be allocated to the wireless device; determining an index based at least on the determined resources allocated to the wireless device, wherein the index indicates a Transport Block Size (TBS) index, a Redundant Version (RV) and a differential modulation; and sending the determined index to the wireless device.

According to another aspect, some embodiments include a network node or base station configured, or operable, to perform one or more functionalities (e.g. actions, operations, steps, etc.) of the network node as described herein.

In some embodiments, the network node may comprise one or more communication interfaces configured to communicate with one or more other radio nodes and/or with one or more network nodes, and processing circuitry operatively connected to the communication interface, the processing circuitry being configured to perform one or more functionalities as described herein. In some embodiments, the processing circuitry may comprise at least one processor and at least one memory storing instructions which, upon being executed by the processor, configure the at least one processor to perform one or more functionalities as described herein.

In some embodiments, the network node may comprise one or more functional modules configured to perform one or more functionalities as described herein.

According to another aspect, some embodiments include a non-transitory computer-readable medium storing a computer program product comprising instructions which, upon being executed by processing circuitry (e.g., at least one processor) of the network node, configure the processing circuitry to perform one or more functionalities as described herein.

This summary is not an extensive overview of all contemplated embodiments and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which.

DETAILED DESCRIPTION

Figure 1:
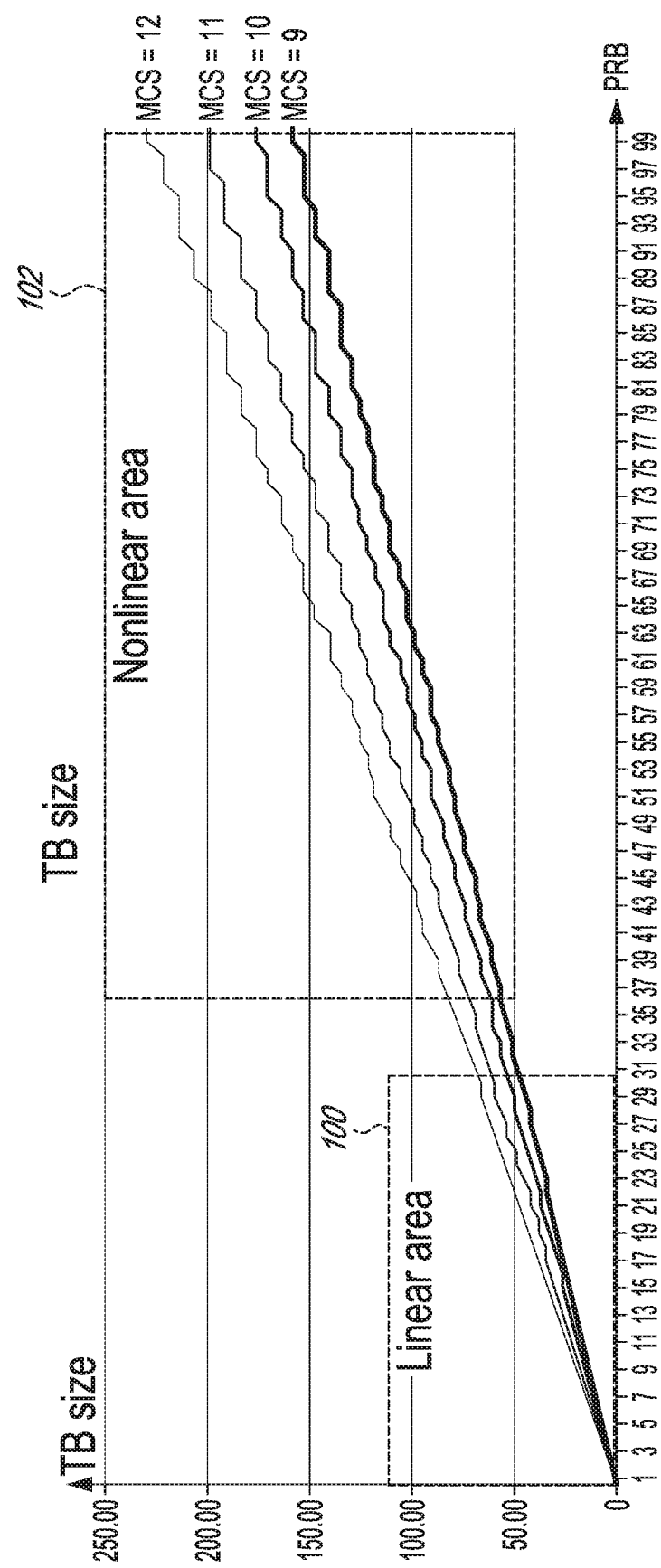
FIG. 1 illustrates a graph of the existing nonlinear TBS table.

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Generally, all terms used herein are to be interpreted according to their ordinary meaning in the relevant technical field, unless a different meaning is clearly given and/or is implied from the context in which it is used. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In the present disclosure, Downlink (DL) data transmissions are used as examples, but the teachings equally apply to UpLink (UL) data transmissions as well. Also, it should be understood that the terms "modulation" and "modulation orders" can be used interchangeably.

1. The Present Embodiments Allow to Reduce the Quantization Error of the TBS:

According to embodiment 2 of Reference 1, the TBS table supports at most 29 levels [0-28] in a new transmission and the last three values, 29-31, are reserved to indicate the redundant versions, i.e. the value spaces for a new transmission and retransmission are completely separated. However, considering that the UE should have received the new transmission (RV0) in most cases (PDCCH DTX BLER <1%) before the retransmission (RV1/2/3) is started, i.e. the probability of having TBS index ambiguity between the new transmission and retransmission is very low, then it's possible to further increase the TBS levels by allowing overlapping the value space between a new transmission and retransmission.

2. The Present Embodiments Allow Support of Different Code Rates Among Groups of Layers:

Although Reference 2 supports different modulations among two groups of layers within one codeword, it however imposes a constraint that two groups of layers adopt the same code rate, which is a too harsh condition to be met in the real environment. As a result, the 5gNB has to decrease one group's code rate or increase the other group's code rate to achieve the same code rate. However, both workarounds result in side effects, i.e. the good channel quality is under-utilized and then the throughput is impacted or the bad channel quality is over-utilized and then the Block Error Rate (BLER) is increased. An ideal solution should allow for any modulation orders and code rates among multiple layers within one codeword.

3. The Embodiments Support Different Modulations (or Modulation Orders) in a Retransmission:

In Reference 2, although embodiment 2 can support different modulations in a new transmission, it can allow for only one modulation in a retransmission. Although the HARQ soft combination in retransmission brings some gain, the "only one modulation" constraint still results in a performance loss. An ideal solution should allow for any modulations among multiple layers in both the new transmission and retransmission without increasing the DCI size.

Merging the Existing 2-Bit RV Field into the TBS Table

This embodiment supports different air condition or channel qualities among different layers, without increasing the DCI size. In other words, two groups of layers in a TB can use different modulation orders depending on their channel conditions. The following teachings/aspects are presented.

1. Overlapped Joint Coding Scheme

Figure 2:
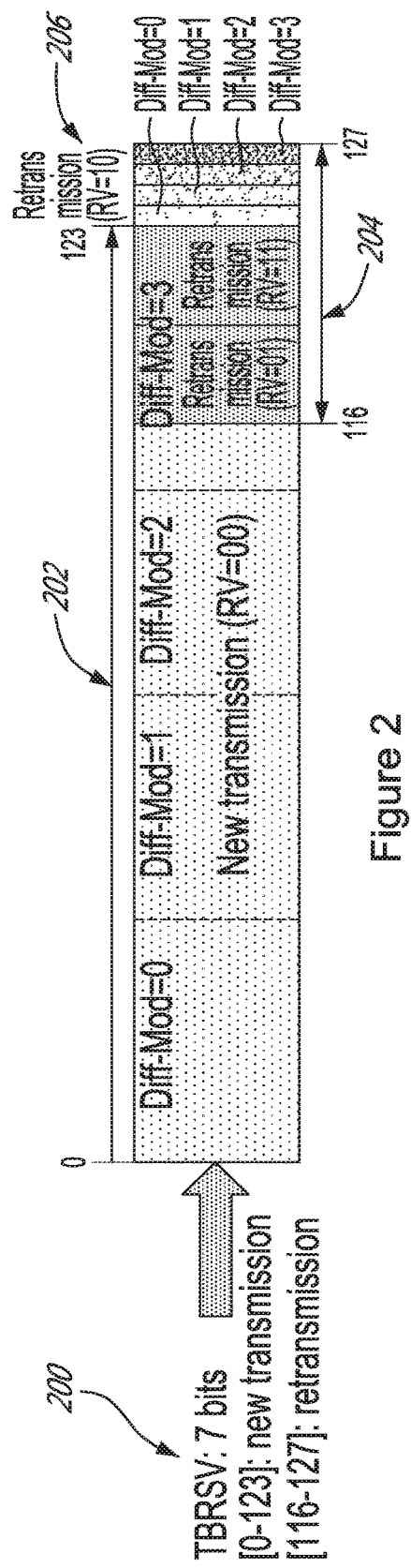
FIG. 2 is a diagram of the 7-bit index in accordance with some embodiments.

The 5-bit for indicating the TBSI (or MCS in LTE) and 2-bit for indicating the RV are jointly coded into a single 7-bit field as shown in FIG. 2. More specifically, FIG. 2 illustrates the range values of the overlapped joint coding of the TBS, Modulation and RV (7 bits) into one index, referred to as the new index or TBSRV index 200. For example, the TBSRV index 200 can have the following values:

i. Range [0-123] (referred to as the value space 202) indicates the TB size and modulation order for a new transmission with RV=00;

ii. Range [116-127] (referred to as the value space 204) indicates the RV number as well as the corresponding modulation in a retransmission, with RV=01, 11 or 10 (note: the TBS value has already been signaled to the UE in the transmission);

iii. Range [116-123] is the overlapped area shared by both a new transmission and retransmission, which is indicated by the New Data Indicator (NDI) field.

Furthermore, the coding of the TBSRV index 200 comprises a differential modulation coding referred to as the differential modulation 206 as will be described below.

2. Differential Modulation Coding

Two groups of layers in a TB can freely select their respective modulation orders depending on their actual channel conditions. A straight forward approach is to add another four bits in the DCI (downlink control information) along with the TBSRV 200 index to explicitly indicate the modulation orders of the first and second groups of layers for both a new transmission and retransmission. This will increase the DCI size and impact the PDCCH decoding success rate. To reduce the number of bits required to indicate the different modulation orders for two groups of layers in a TB, a differential coding scheme is proposed to indicate the difference of modulation orders between two groups of layers in a TB (as shown in FIG. 2). FIG. 2 illustrates a differential coding to indicate the different modulations for two groups.

For example, the new transmission value space 202 from [0-123] is further divided into 4 subareas, each of which representing a specific modulation order difference 208. The modulation order difference can take any one of the values from [0-3] between two groups. For example, Diff-Mod=0 means that two groups of layers have the same modulation order; Diff-Mod=1 means the modulation orders of two groups of layers have one difference, such as QPSK-16QAM, or 16QAM-64QAM, 64QAM-256 QAM.

Figure 3:
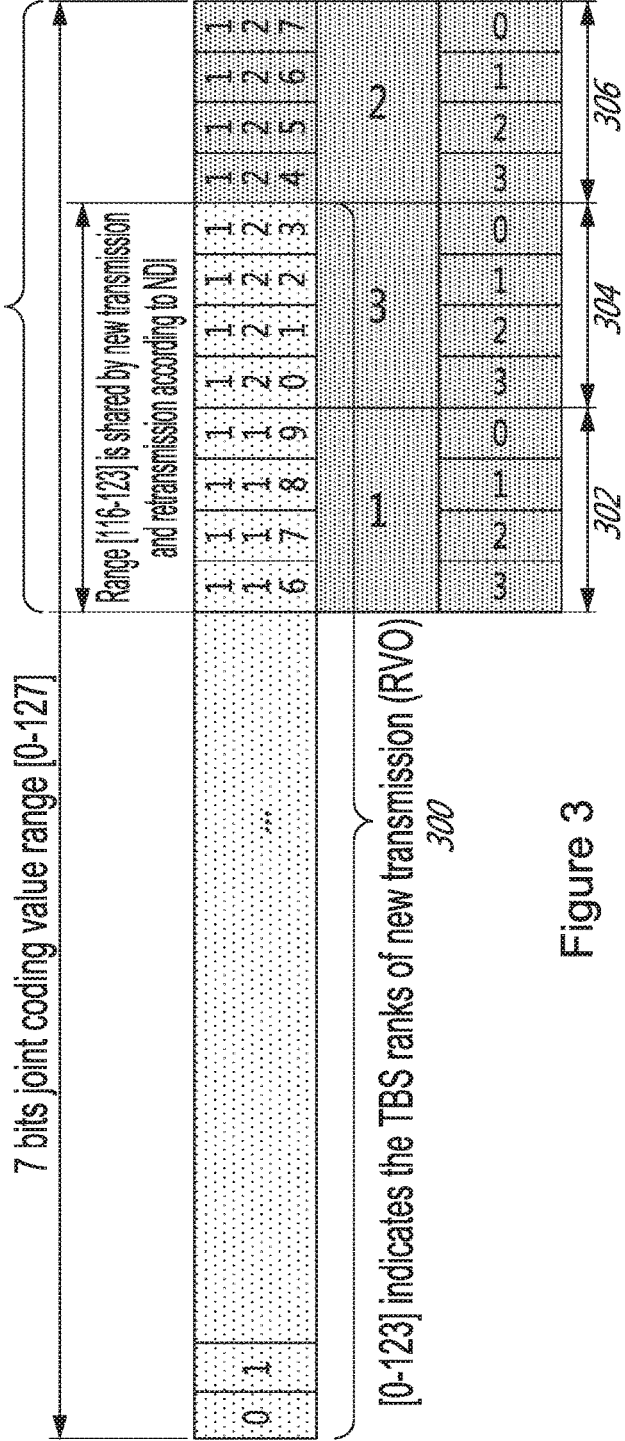
FIG. 3 is another diagram of the 7-bit index in accordance with some embodiments.

More specifically, FIG. 3 illustrates the range values (referred to as 300) of [116-127] of the index 200, where different values of the index indicate different redundant versions and modulation orders. For example, range values [116-119] correspond to a redundant version 1 (with differential modulations 0 to 3) 302. Range values [120-123] correspond to a redundant version 3 (with differential modulations 0 to 3) 304 and range values [124-127] correspond to redundant version 2 (with differential modulations 0 to 3) 306.

As mentioned above, the differential coding scheme in the asymmetric 7-bit value space allows to represent the modulations of two groups of layers using the 7 bits TBSRV index 200, as will be explained below.

Figure 4:
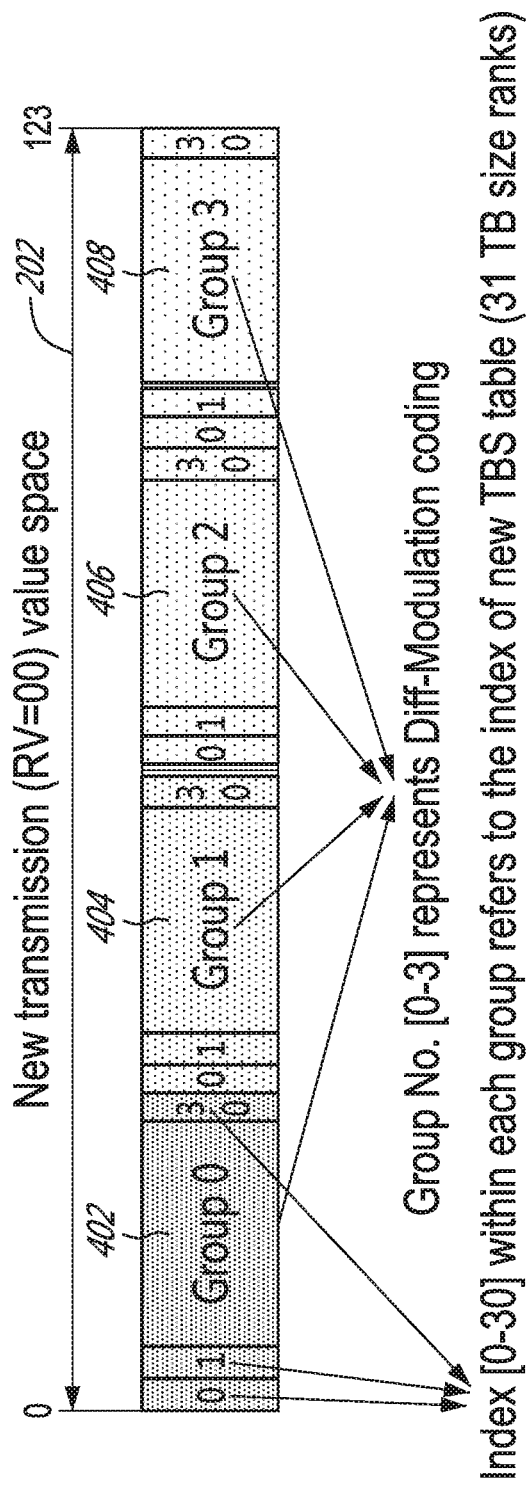
FIG. 4 illustrates the value space of the 7-bit index allocated for a transmission, in accordance with some embodiments.

For example, as illustrated in FIG. 4, the new transmission value range [0-123] (or value space 202) is further divided into 4 groups 404, 404, 406 and 408, each of which has 31 values [0-30] that act as the index of the TBS table 2 to indicate the TB size of a new transmission.

TABLE 2

Illustration of the TBS table

| TBS Index | 1 nrofNominalRb ($N_{PRB}^{norm}$) | 2 nrofNominalRbs ($N_{PRB}^{norm}$) | ... | 100 nrofNominalRbs ($N_{PRB}^{norm}$) |
|---|---|---|---|---|
| 0 | $TBS_{0,1}$ | $TBS_{0,2}$ | ... | $TBS_{0,000}$ |
| 1 | $TBS_{1,1}$ | $TBS_{1,2}$ | ... | $TBS_{1,100}$ |
| ... | ... | ... | ... | ... |
| 27 | $TBS_{28,1}$ | $TBS_{28,2}$ | ... | $TBS_{28,100}$ |
| 28 | QPSK | QPSK | ... | QPSK |
| 29 | 16QAM | 16QAM | ... | 16QAM |
| 30 | 64QAM | 64QAM | ... | 64QAM |
| 31 | 256QAM | 256QAM | ... | 256QAM |

The group No. [0-3] (referred to as 402-408) corresponds to the differential modulation and represents the difference of modulation order (DMO) between the two groups of layers within one codeword as follows:

DMO=00 (zero)->both groups have the same modulation order;

DMO=01 (one)->the modulation order difference between two groups is one, i.e., [16QAM, QPSK], [64QAM, 16QAM], and [256QAM, 64QAM];

DMO=10 (two)->the modulation order difference between two groups is two, i.e., [64QAM, QPSK], and [256QAM, 16QAM];

DMO=11 (three)->the modulation order difference between two groups is three, i.e., [256QAM, QPSK].

The following table summarizes all possible modulation combinations of two groups

TABLE 3

Differential Coding Scheme for modulation orders

| Modulation Orders' Differentiate Coding | Modulation Order of a Group | Modulation Order of the Other Group |
|---|---|---|
| 0 0 | QPSK | QPSK |
|  | 16QAM | 16QAM |
|  | 64QAM | 64QAM |
|  | 256QAM | 256QAM |
| 0 1 | 16QAM | QPSK |
|  | 64QAM | 16QAM |
|  | 256QAM | 64QAM |
| 1 0 | 64QAM | QPSK |
|  | 256QAM | 16QAM |
| 1 1 | 256QAM | QPSK |

3. DMRS-Based Blind Detection

Figure 5:
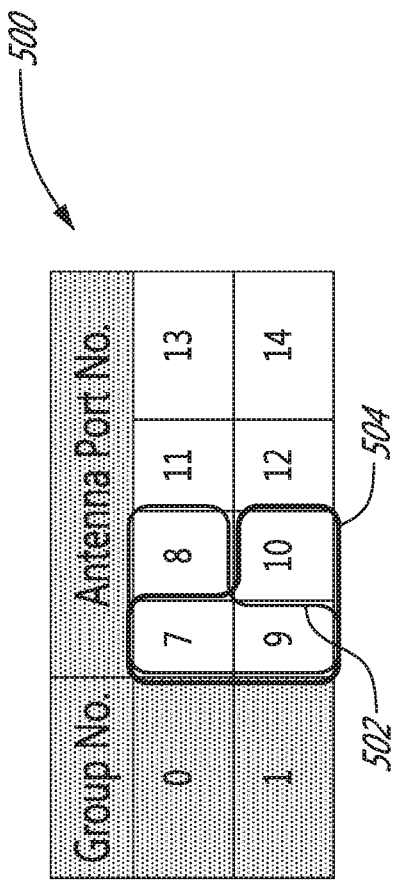
FIG. 5 illustrates the split of a codeword into 2 groups of layers, in accordance with some embodiments.

Since two groups may have different modulation orders, even if the UE knows already the modulation of each group, it still can't demodulate the data unless it clearly knows the exact layer number for each group. Instead of introducing extra bits to explicitly indicate the layer number of each group, this disclosure presents a smart layer split method, referred to as blind detection of DMRS, for the UE to determine the layer number of each group in a self-descriptive way. FIG. 5 illustrates a DMRS-based smart layer split 500 between two groups.

Let's take a 3 layer as an example for the DMRS-based blind detection. For example, for a 3-layer Single User-Multiple Input Multiple Output (SU-MIMO), there are two valid layers split options into two groups referred to as Group 0 and Group 1:
  i. lighter (green) contour 502: Group 0 has 2 layers corresponding to antenna ports 7 and 8 and Group 1 has 1 layer corresponding to antenna port 9;
  ii. darker (red) contour 504: Group 0 has 1 layer corresponding to antenna port 7 and Group 1 has 2 layers corresponding to antenna ports 9 and 10.

Since each layer is uniquely indicated by its corresponding antenna port (8 layers corresponding to antenna ports 7-14) identified by DMRS, which can be recognized as the orthogonal sequences when the SU-MIMO condition is met (UE report Rank Indicator (RI)=3), the UE can determine each option between the two possible options by detecting the received DMRS (port 7/8/9 or 7/9/10).

4. Sliding Window Algorithm

Figure 6:
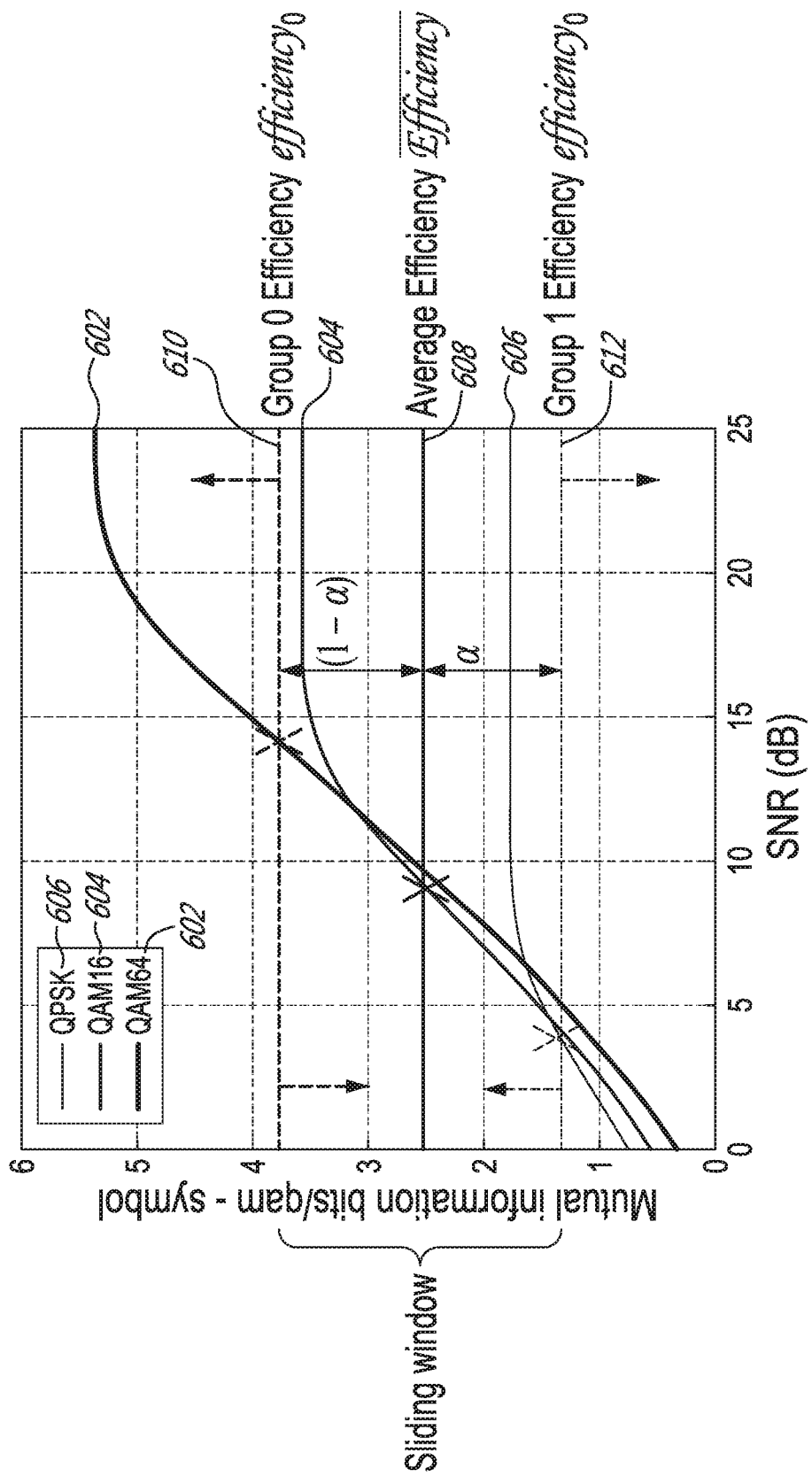
FIG. 6 is a diagram of a graph illustrating the sliding window mechanism, in accordance with some embodiments.

Based on the differential modulation coding and layers split mechanism, an efficient sliding window algorithm is further developed to determine the modulation order for each group of layers. FIG. 6 illustrates a graph showing a sliding window algorithm for determining the modulation of each group.

The three curves (602, 604 and 606) in the graph of FIG. 6 show the relation between the air channel's transmission capability (efficiency, bits per RE) and its corresponding channel quality (SNR) under three different modulations, QPSK (given by curve 606), 16QAM (given by curve 604) and 64QAM (given by curve 602). From the graph, it can be seen that for a given efficiency, there always exists a specific modulation which requires the minimum SNR to accommodate the transmission efficiency. In other words, once the transmission $$\text{efficiency}\left(=\frac{bits}{N_{RE}}\right)$$

is known, the corresponding modulation order can be derived using the graph: the modulation order corresponds to the first intersection point of the curve with the horizontal line.

The sliding window algorithm is a procedure to determine the modulation orders of two groups, which keeps the middle line 608 (corresponding to an average efficiency) as the fixed position and slides two window edges/lines 610 and 612 until the known modulation order difference is met. The window edge 610 corresponds to the upper line above the middle line 608 and represents the first group's efficiency (e.g. group 0's efficiency) efficiency. The window edge 612 corresponds to the lower line (below the middle line 608) and represents the second group's efficiency (e.g. group 1's efficiency). The two edges (610 and 612) and middle line (608) are given by the following formula:

$$\frac{totalTBS}{Num^{RE} \times Num^{layer}} = \overline{\text{Efficiency}} = \text{efficiency}_0 \times \alpha + \text{efficiency}_1 \times (1-a) \quad (2)$$

$$\text{Where } \alpha = \frac{Num_0^{layer}}{Num^{layer}}$$

which represents the weight of group 0's efficiency, $$(1-\alpha) = \frac{Num_1^{layer}}{Num^{layer}}$$

which represents the weight of group 1's efficiency, and $Num^{layer} = Num_0^{layer} + Num_1^{layer}$ which refers to the total layer number.

The two window edges' moving directions are opposite to each other in order to keep the middle line 608 stationary so that the sliding window stops at a certain position where the distance between the two edges (window width) equals to the known modulation order difference.

Figure 7:
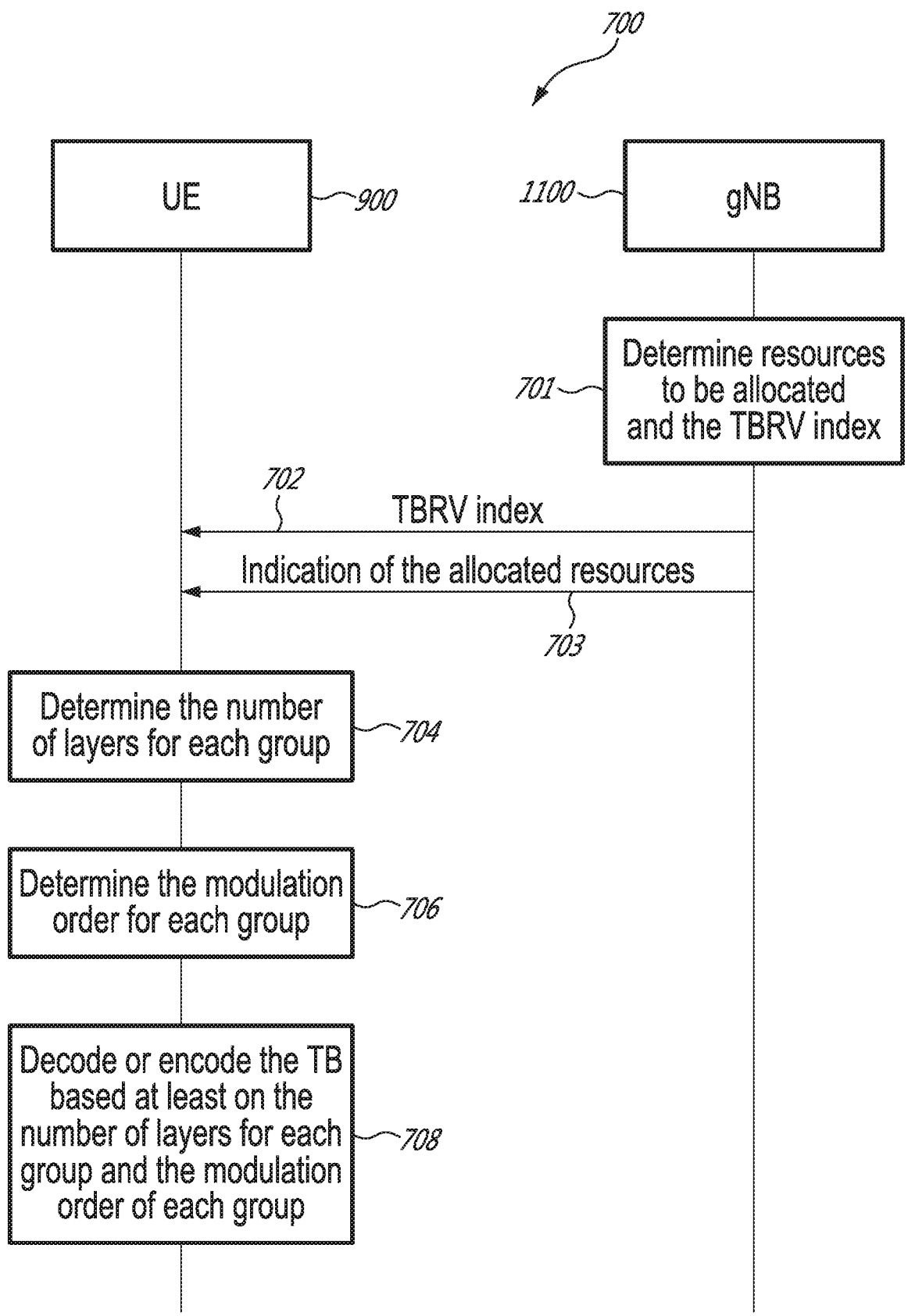
FIG. 7 is a signaling diagram between a wireless device and a base station for handling user data, in accordance with some embodiments.
Figure 9:
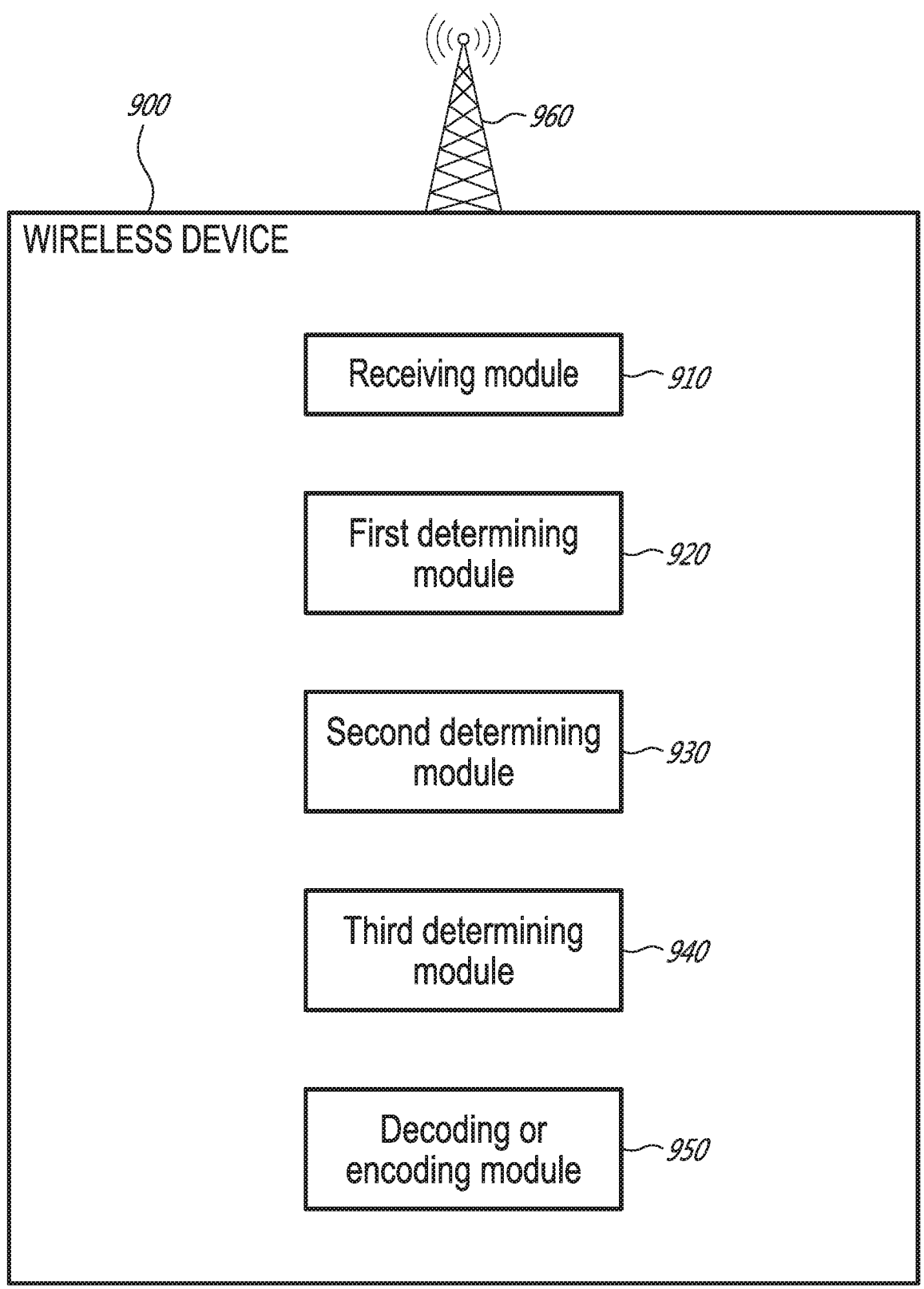
FIG. 9 is another block diagram of a wireless device, in accordance with some embodiments.
Figure 11:
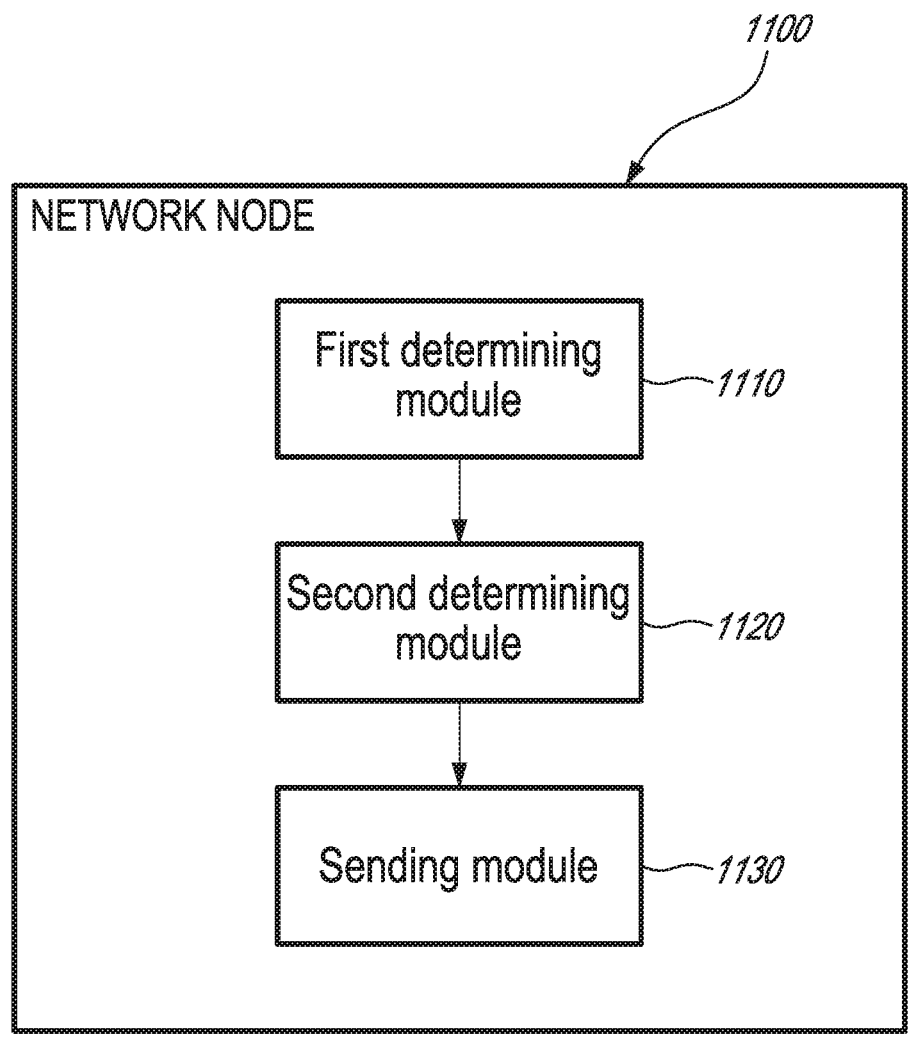
FIG. 11 is schematic block diagram of a network node, in accordance with some embodiments.

Now turning to FIG. 7, a general procedure 700 of handling user data, in a wireless network, comprising one or more wireless devices such as 900 of FIG. 9 and one or more base stations/network nodes/gNB/SgNB such as 1100 of FIG. 11, in accordance with the embodiments of the present disclosure is described. The embodiments can unconditionally support almost all LA (link adaptation) related to important features (such as non-linear relationship between TBS and PRB, channel diversity within one codeword, self-descriptive layer mapping) in 5g NR using the same DCI size as the existing LTE standard. This guarantees that the embodiments can be applied to all kinds of 5G scenarios.

Step 701) The network node 1100 determines resources to be allocated to the wireless device. The network node also determines a TBRV index and sends it to the wireless device 900. The details for determining the resources and the TBRV index will be explained with reference to FIG. 10.

Steps 702-703) The UE receives the TBRV index (7 bits) and a resource allocation indication (e.g. a number of PRBs). The index and the resource allocation indication can be received in the same message (in message 702 for example) or in different messages (messages 702 and 703). For example, the TBRV index 200 and resource allocation indication can be given by the DCI.

step 704) Determine the layer number in each group of the codeword.

It is assumed that the codeword has 2 groups of layers. To keep the DCI size small, the 5gNB only indicates the total layer number of one codeword to the UE, instead of the explicit designation of the layer number within each group. As such, the UE needs to derive the number of layers for each group, using the blind detection of DMRS, for example.

To explain the blind detection better, the principle of blind detection from both the 5gNB's and UE's views will be described respectively.

a) 5gNB's View

The 5gNB prefers non-codebook based precoding in SU-MIMO, i.e., 5gNB always uses its own internal weight vectors to do precoding of the specific layer before doing a Fast Fourier Transform (FFT). Since those internal weight vectors are only visible to 5gNB (i.e. they are not notified to the UE through the air interface), the 5gNB has the flexibility to adjust their relative positions. To understand the use of the precoding matrix better, the received signal vector can be written into the following form: Y=H*PX+Z where Y refers to the received signals at the UE side, H is an m×n MIMO channel matrix, P is an n×L precoding matrix, X is a vector of L-layer symbols to be transmitted, and Z is a noise vector for the background Gaussian noise plus interference.

An orthogonal 2×2 MIMO case is taken as a simple example, in which there are two layers per TB. The channel matrix H is then given by:

$$H = \begin{bmatrix} h_1 & 0 \\ 0 & h_2 \end{bmatrix}$$

Two precoding matrixes are defined as:

$$P_1 = \begin{bmatrix} 1 & 0 \\ 0 & 1 \end{bmatrix},$$

$$P_2 = \begin{bmatrix} 0 & 1 \\ 1 & 0 \end{bmatrix}$$

If $|h_1| \geq |h_2|$, $P_1$ is selected at 5gNB. The received signal at the UE side would be:

$$Y = HP_1X + Z = \begin{bmatrix} h_1 & 0 \\ 0 & h_2 \end{bmatrix}\begin{bmatrix} 1 & 0 \\ 0 & 1 \end{bmatrix}\begin{bmatrix} x_1 \\ x_2 \end{bmatrix} + Z = \begin{bmatrix} h_1 x_1 \\ h_2 x_2 \end{bmatrix} + Z$$

Where $x_1$ and $x_2$ stand for the user data signals mapped to layer 1 and 2, respectively.

Here the symbol from layer 1, i.e., $x_1$, is going through the stronger channel $h_1$.

If $|h_1| < |h_2|$, $P_2$ is selected. The received signal at the UE side would be:

$$Y = HP_2X + Z = \begin{bmatrix} h_1 & 0 \\ 0 & h_2 \end{bmatrix}\begin{bmatrix} 0 & 1 \\ 1 & 0 \end{bmatrix}\begin{bmatrix} X_1 \\ X_2 \end{bmatrix} + Z = \begin{bmatrix} h_1 x_2 \\ h_2 x_1 \end{bmatrix} + Z$$

Here the symbol from layer 2, i.e., layer symbol $x_2$, is going through the stronger channel $h_2$. Without loss of generality, the rule is specified that the $1^{st}$ group always has the higher or same modulation order than the $2^{nd}$ group, because:

1. On one hand, the precoding matrix columns have a one-to-one mapping relation with the corresponding layer of data; the adjustment of order of the precoding column is just equivalent to the change of the relative position of any layer of data. So, by selecting a proper precoding matrix, 5gNB can guarantee that layer 1 always uses better channel quality than layer 2.
2. On the other hand, since the modulation order is selected based on the channel quality and the higher modulation order corresponds to the higher channel quality, 5gNB can select a proper precoding matrix to guarantee that the modulation order of the first group is always greater than or equal to the second one.

The UE then relies on the DMRS (demodulation reference signal) associated with each layer to correctly demodulate $x_1$ and $x_2$, respectively.

b) UE's View

The 5gNB can guarantee that group 1 always takes the larger or same modulation order than group 2, by selecting a proper precoding matrix. The UE also knows the total layer number from the DCI, but how does the UE decide the layer number of each group? The answer is that the UE blindly detects the DMRS of a corresponding layer to determine how many layers are included in each group.

As mentioned before, the precoding matrix is determined by the 5gNB itself without notification to the UE. So, there exists a known reference as baseline for the UE to evaluate the combination result of air channel matrix H and precoding matrix P. That reference is just the DMRS, which is a predefined signal sequence known by both the 5gNB and UE. The DMRS actually stands for the so-called antenna port which identifies a specific layer of data. Let's consider Transport Mode 9 (TM9) in LTE as an example to explain the blind detection of DMRS. For TM9, the 8 layers are identified by ports 7-14 (corresponding to DMRS 0-7) which have been divided into two groups as shown in FIG. 5. For example, group 0 has port 7/8/11/13 and group 1 has 9/10/12/14. It should be noted that LTE requires consecutive antenna ports in SU-MIMO (for example, 3 layers must use port 7, 8, 9), but in this disclosure the antenna ports are determined based on the blind detection of DMRS.

Let's take 3 layers as an example to show the layer split. There are two valid options for 3 layers MIMO:

Option 1: The three layers are mapped to ports 7, 9, and 10. Group 0 has one layer which maps port 7, and group 1 has two layers which map to ports 9 and 10.

Option 2: The three layers are mapped to ports 7, 8, and 9. Group 0 has two layers which map to ports 7 and 8, and group 1 has one layer which maps to ports 9.

Since the DMRS sequences of different ports are orthogonal to each other, the UE can unambiguously detect the 5gNB's decision from two possible options by correlating the DMRS sequences of different ports with the received signals. If the correlation result is higher than a predefined power threshold, it shows that the DMRS of the specific antenna port has been chosen by 5gNB, which means that the corresponding layer of data exists in that group. For example, if port 8 is detected, option 2 is adopted; if port 10 is detected, option 1 is adopted. By using such a blind detection mechanism, the UE can always unambiguously split the total layer number into two groups, i.e., it determines the layer number of each group.

step 706) Determine the Modulation Order for Each Group

In this section, the algorithm for how to determine the actual modulation order for each group is discussed in detail.

Case 1: Both Groups have the Same Modulation Order (Differential Modulation=0)

Since the modulation orders of all the layers are the same, the method discussed in Reference 1 can be used to determine the modulation order. For example, first, the RE efficiency is calculated with the following equation:

$$\text{efficiency} = \frac{TBS}{\text{total } RE \text{ number}}$$

Then search through the RE Efficiency Colum in Table 4 below and find the RE Efficiency value which is closest to the calculated $\overline{\text{efficiency}}$ and its corresponding modulation order.

TABLE 4

RE Efficiency and Modulation Order

| Modulation Order (M) | RE Efficiency × 256 |
|---|---|
| 0 | 2 | 60 |
| 1 | 2 | 96.5 |
| 2 | 2 | 154 |
| 3 | 2 | 224.5 |
| 4 | 2 | 301 |
| 5 | 4 | 378 |
| 6 | 4 | 434 |
| 7 | 4 | 490 |
| 8 | 4 | 553 |
| 9 | 4 | 616 |
| 10 | 4 | 658 |
| 11 | 6 | 699 |
| 12 | 6 | 775.5 |
| 13 | 6 | 850.5 |
| 14 | 6 | 924 |
| 15 | 6 | 999 |
| 16 | 6 | 1078.5 |
| 17 | 6 | 1158 |
| 18 | 6 | 1233 |
| 19 | 6 | 1309.5 |
| 20 | 8 | 1365 |
| 21 | 8 | 1422 |
| 22 | 8 | 1508 |
| 23 | 8 | 1594 |
| 24 | 8 | 1682 |
| 25 | 8 | 1770 |
| 26 | 8 | 1833 |
| 27 | 8 | 1896 |

Case 2: The Modulation Order Difference Between Two Groups is 1 or 2 (Differential Modulation=1 or 2)

The following table shows different values of α.

TABLE 5

α set table

| Total layer number | Layer$_{grp0}$:Layer$_{grp1}$ | α |
|---|---|---|
| 2 | 1:1 | $\left(\frac{1}{2}\right)$ |
| 3 | 1:2 or 2:1 | $\left(\frac{1}{3}, \frac{2}{3}\right)$ |
| 4 | 2:2 | $\left(\frac{1}{2}\right)$ |
| 5 | 2:3 or 3:2 | $\left(\frac{2}{5}, \frac{3}{5}\right)$ |
| 6 | 3:3 | $\left(\frac{1}{2}\right)$ |
| 7 | 3:4 or 4:3 | $\left(\frac{3}{7}, \frac{4}{7}\right)$ |
| 8 | 4:4 | $\left(\frac{1}{2}\right)$ |

The table 5 shows α with 7 feasible values: ⅓, ⅖, 3/7, ½, 4/7, ⅗, ⅔. For each value, the minimum and maximum average efficiencies pair $\langle \overline{\text{efficiency}_{min}^{\alpha}}$ $\overline{\text{efficiency}_{max}^{\alpha}} \rangle$ can be calculated offline in advance using the following formula:

$$\overline{\text{efficiency}_{min}^{\alpha}} = E_{min}^{grp1} \times \alpha + E_{min}^{grp2} \times (1-\alpha)$$

$$\overline{\text{efficiency}_{max}^{\alpha}} = E_{max}^{grp1} \times \alpha + E_{max}^{grp2} \times (1-\alpha)$$

Where $E_{min}^{grp1}$ and $E_{min}^{grp2}$ refer to group 1 and group 2's minimum efficiency respectively and $E_{max}^{grp1}$ and $E_{max}^{grp2}$ refer to maximum efficiency for a given Diff-Mod (see Table 6 which is retrieved from table 3).

TABLE 6

The minimum and maximum efficiencies of two groups vs. differential coding schemes (1 and 2)

| Diff-Mod | M1:M2 | $E_{min}^{grp1}$ | $E_{max}^{grp1}$ | $E_{min}^{grp2}$ | $E_{max}^{grp2}$ |
|---|---|---|---|---|---|
| 1 | 16QAM:QPSK | 1.477 | 2.57 | 0.134 | 1.326 |
|   | 64QAM:16QAM | 2.73 | 5.115 | 1.477 | 2.57 |
|   | 256QAM:64QAM | 5.332 | 7.6 | 2.73 | 5.115 |
| 2 | 64QAM:QPSK | 2.73 | 5.115 | 0.134 | 1.326 |
|   | 256QAM:16QAM | 5.332 | 7.6 | 1.477 | 2.57 |

All calculated average efficiency pairs $\langle \overline{\text{efficiency}_{min}^{\alpha}}$ $\overline{\text{efficiency}_{max}^{\alpha}} \rangle$ can be categorized into the following table (Table 7). Note that all efficiency segments under the same column (for a given a) and Diff-Mod (1 or 2) are always strictly increased and seamlessly concatenated, since the following relation about efficiency under different modulations is always true:

$$E_{max}^{256QAM} > E_{min}^{256QAM} > E_{max}^{64QAM} > E_{min}^{64QAM} > E_{max}^{16QAM} > E_{min}^{16QAM} > E_{max}^{QPSK} > E_{min}^{QPSK}$$

The following table shows the minimum and maximum averaged efficiencies of two groups vs. differential coding schemes (1 and 2) for different a values

TABLE 7

The minimum and maximum averaged efficiencies of two groups vs. differential coding schemes (1 and 2) for different α values

| Diff-Mod | M1:M2 | a = 1/3 | | a = 2/5 | | a = 3/7 | |
|---|---|---|---|---|---|---|---|
| | | $\overline{E_{min}^{\alpha}}$ | $\overline{E_{max}^{\alpha}}$ | $\overline{E_{min}^{\alpha}}$ | $\overline{E_{max}^{\alpha}}$ | $\overline{E_{min}^{\alpha}}$ | $\overline{E_{max}^{\alpha}}$ |
| 1 | 16QAM:QPSK | 0.582 | 1.741 | 0.671 | 1.824 | 0.710 | 1.859 |
|   | 6QAM:16QAM | 1.895 | 3.418 | 1.978 | 3.588 | 2.014 | 3.661 |
|   | 256QAM:64QAM | 3.597 | 5.943 | 3.771 | 6.109 | 3.845 | 6.180 |

TABLE 7-continued

The minimum and maximum averaged efficiencies of two groups vs.
differential coding schemes (1 and 2) for different α values

| 2 | 64QAM:QSPK | 0.999 | 2.589 | 1.172 | 2.842 | 1.247 | 2.950 |
|---|---|---|---|---|---|---|---|
|   | 256QAM:16QAM | 2.762 | 4.247 | 3.019 | 4.582 | 3.129 | 4.726 |

| Diff- | | a = 1/2 | | a = 4/7 | | a = 3/5 | | a = 2/3 | |
|---|---|---|---|---|---|---|---|---|---|
| Mod | M1:M2 | $\overline{E_{min}}^\alpha$ | $\overline{E_{max}}^\alpha$ | $\overline{E_{min}}^\alpha$ | $\overline{E_{max}}^\alpha$ | $\overline{E_{min}}^\alpha$ | $\overline{E_{max}}^\alpha$ | $\overline{E_{min}}^\alpha$ | $\overline{E_{max}}^\alpha$ |
| 1 | 16QAM:QPSK | 0.806 | 1.948 | 0.901 | 2.037 | 0.940 | 2.072 | 1.029 | 2.155 |
|   | 6QAM:16QAM | 2.104 | 3.843 | 2.193 | 4.024 | 2.229 | 4.097 | 2.312 | 4.267 |
|   | 256QAM:64QAM | 4.031 | 6.358 | 4.217 | 6.535 | 4.291 | 6.606 | 4.465 | 6.772 |
| 2 | 64QAM:QPSK | 1.432 | 3.221 | 1.617 | 3.491 | 1.692 | 3.599 | 1.865 | 3.852 |
|   | 256QAM:16QAM | 3.405 | 5.085 | 3.680 | 5.444 | 3.790 | 5.588 | 4.047 | 5.923 |

The following steps are used to decide the actual modulation orders of two groups simultaneously:

Step a: calculate an average efficiency between two groups using the following formula:

$$\overline{\text{efficiency}} = \frac{TBS}{\text{Total}_{layer} \times N_{RE}}$$

Step b: use the calculated average efficiency, the a value, and Diff-Mod to look up the above table 7.

As mentioned above, all efficiency segments (in the same column) under the same Diff-Mod and α value are always strictly increased and seamless concatenated so that the calculated average efficiency falls into a specific segment which is then mapped back to a unique modulation pair ($M_1$: $M_2$).

For example, if Diff-Mod=1 and α=⅗, if the calculated $\overline{\text{efficiency}}$ is between 1.895 and 3.418, then, the modulation orders for the first and second groups are 64 QAM and 16 QAM, respectively.

In another example, if Diff-Mod=2 and α=⅗, if the calculated $\overline{\text{efficiency}}$ is between 3.79 and 5.588, then, the modulation orders for the first and second groups are 256 QAM and 16 QAM, respectively.

Case 3: The Modulation Order Difference Between Two Groups is 3 (Differential Modulation=3)

In this case, it is known that the modulation orders for the first and second groups are 256 QAM and QPSK, respectively, without any ambiguity.

Step 708) Decode or Encode the Transport Block

After obtaining the modulation order for each group, the total number of raw physical bits (the coded bits) in the assigned physical layer resources can be calculated, based on the number of PRBs assigned, the number of REs in each PRB, the number of layers in each group, and the modulation order for each group. The code rate can be calculated as follows:

codeRate=TBS/totalNrofRawBits

Based on the TBS, codeRate, and totalNrofRawBits, the UE can try to decode or encode the transport block. If it passes the Cyclic Redundancy Check (CRC), an ACK will be sent to the 5gNB. Otherwise, a NACK will be sent.

During the retransmission, if the UE can get enough PRB resources, the existing handling mechanism is still reused.

In another embodiment, instead of using the differential coding of modulations of two groups of layers, a new two-bit field can be added to the existing two-bit field for differential coding of modulations to explicitly indicate the modulation for each group of layers in a codeword. At the 5gNB, after the TBS value is determined based on Table 2, the modulation for each group of layers in a codeword can be determined based on its calculated efficiency through table 8. At the UE, since the modulations for both groups of layers are explicated indicated in the DCI, it can use them to decode or encode the transport block by using step 708.

TABLE 8

MCS Index, Modulation Order, Code Rate, and RE Efficiency

| MCS Index | Mod Order | Code Rate | RE Efficiency |
|---|---|---|---|
| 0 | 2 | 0.067 | 0.134 |
| 1 | 2 | 0.117 | 0.234 |
| 2 | 2 | 0.188 | 0.377 |
| 3 | 2 | 0.301 | 0.602 |
| 4 | 2 | 0.438 | 0.877 |
| 5 | 2 | 0.588 | 1.176 |
| 6 | 2 | 0.663 | 1.326 |
| 7 | 4 | 0.369 | 1.477 |
| 8 | 4 | 0.424 | 1.695 |
| 9 | 4 | 0.479 | 1.914 |
| 10 | 4 | 0.540 | 2.160 |
| 11 | 4 | 0.602 | 2.406 |
| 12 | 4 | 0.643 | 2.570 |
| 13 | 6 | 0.455 | 2.730 |
| 14 | 6 | 0.505 | 3.029 |
| 15 | 6 | 0.554 | 3.322 |
| 16 | 6 | 0.602 | 3.609 |
| 17 | 6 | 0.650 | 3.902 |
| 18 | 6 | 0.702 | 4.213 |
| 19 | 6 | 0.754 | 4.523 |
| 20 | 6 | 0.803 | 4.816 |
| 21 | 6 | 0.853 | 5.115 |
| 22 | 8 | 0.667 | 5.332 |
| 23 | 8 | 0.694 | 5.555 |
| 24 | 8 | 0.736 | 5.891 |
| 25 | 8 | 0.778 | 6.227 |
| 26 | 8 | 0.821 | 6.570 |
| 27 | 8 | 0.864 | 6.914 |
| 28 | 8 | 0.895 | 7.160 |
| 29 | 8 | 0.926 | 7.406 |
| 30 | 8 | 0.950 | 7.600 |

Figure 8:
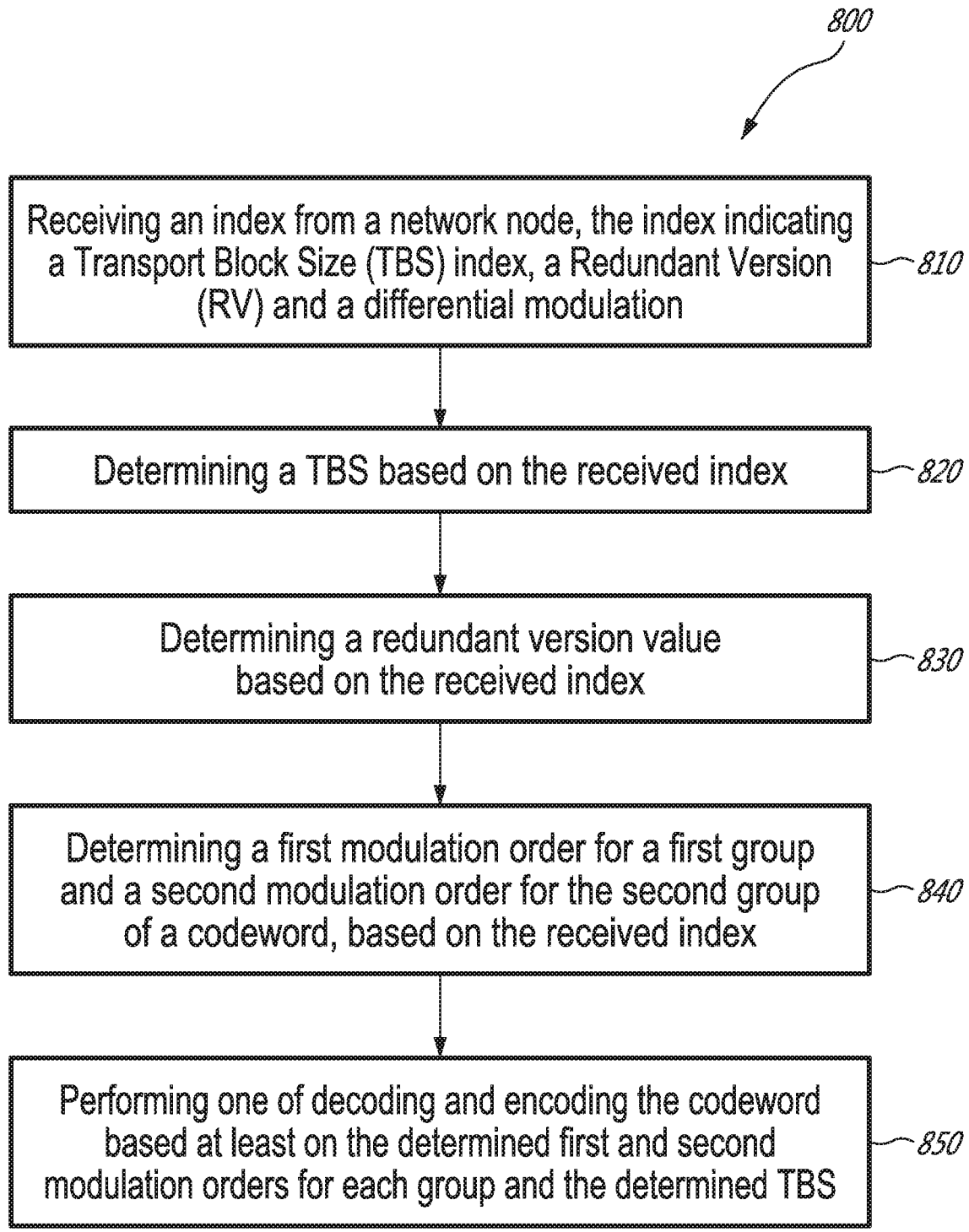
FIG. 8 is a flow chart of a method implemented in a wireless device in accordance with some embodiments.

FIG. 8 illustrates a flow chart of a method 800 for handling user data. It is assumed that the user data are converted into codewords, with each codeword having two groups of layers. Method 800 may be implemented in a wireless device or UE such as 900 of FIG. 9.

The method 800 comprises:

Receiving an index from a network node, the index indicating a Transport Block Size (TBS) index, a Redundant Version (RV) and a differential modulation (block 810).

Determining a TBS based on the received index (block 820).

Determining a redundant version value based on the received index (block 830).

Determining a first modulation order for a first group of layers and a second modulation order for a second group of layers of a codeword, based on the differential modulation (block 840).

Performing one of decoding and encoding the codeword based at least on the determined first and second modulation orders for each group, the determined TBS and the determined redundant version value (block 850).

In some embodiments, the method 800 may further comprise receiving an indication of resource blocks allocated to the wireless device.

In some embodiments, the received index may be 7 bit-long. For example, the values [0-123] of the index indicate a TB size and modulation order for a new transmission, the values [116-127] of the index indicate a redundant version and modulation order for a retransmission. The values [116-123] of the index are overlapped values shared by both the new transmission and retransmission.

In some embodiments, the differential modulation may indicate a difference of modulation orders between the two groups of layers. For example, when the differential modulation is zero, it indicates that the two groups have a same modulation order. When the differential modulation is one, it indicates a modulation order difference of one between the two groups is one. When the differential modulation is two, it indicates a modulation order difference of two between the two groups. When the differential modulation is three, it indicates a modulation order difference of three between the two groups.

In some embodiments, method 800 further comprises determining a number of layers in each group of the codeword. The determination of the number of layers can be done based on a received demodulation reference signal (DMRS), for example.

As seen in block 840, the first and second modulation orders can be determined based on the differential modulation. For example, if the differential modulation is zero, method 800 may comprise determining a TBS based on the received TBS index and a nominal number of resource blocks; determining a resource element (RE) efficiency based on the determined TBS and a number of REs in the allocated resource blocks; and determining the first and second modulation orders based on the determined resource element efficiency. For example, based on the determined RE efficiency, the corresponding modulation order can be determined by looking up a table correlating RE efficiency values with modulation orders (see Table 4).

For example, if the differential modulation is 1 or 2, method 800 may comprise determining a TBS based on the received TBS index and a nominal number of resource blocks; calculating an average efficiency between the first group and the second group based on the determined TBS; and determining the first and second modulation orders based on the calculated average efficiency. For example, the corresponding first and second modulations orders can be determined by looking up a table correlating the first and second modulations with minimum and maximum efficiencies (the average efficiency being in between the minimum and maximum efficiency values).

For example, if the differential modulation is 3, then the first modulation order is mapped to 256 QAM and the second modulation order is mapped to QPSK. As a note, these mappings are only exemplary. With more modulations available in the future, the mappings may differ.

FIG. 9 illustrates a wireless device 900 for performing method 800 according to an embodiment. The wireless device 900 may comprise an antenna 960 for example. It is understood that the wireless device 900 may comprise other components well-known in the art. The wireless device 900 is configured to perform method 800 of FIG. 8, for example. The wireless device 900 may comprise a receiving module 910, a first determining module 920, a second determining module 930, a third determining module 940 and a decoding or encoding module 950.

The receiving module 910 is configured to perform at least block 810 of method 800 of FIG. 8. The first determining module 920 is configured to perform at least block 820 of method 800 of FIG. 8. The second determining module 930 is configured to perform at least block 830 of method 800 of FIG. 8. The third determining module 940 is configured to perform at least block 840 of method 800 of FIG. 8. The decoding or encoding module 950 is configured to perform at least block 840 of method 800.

Figure 10:
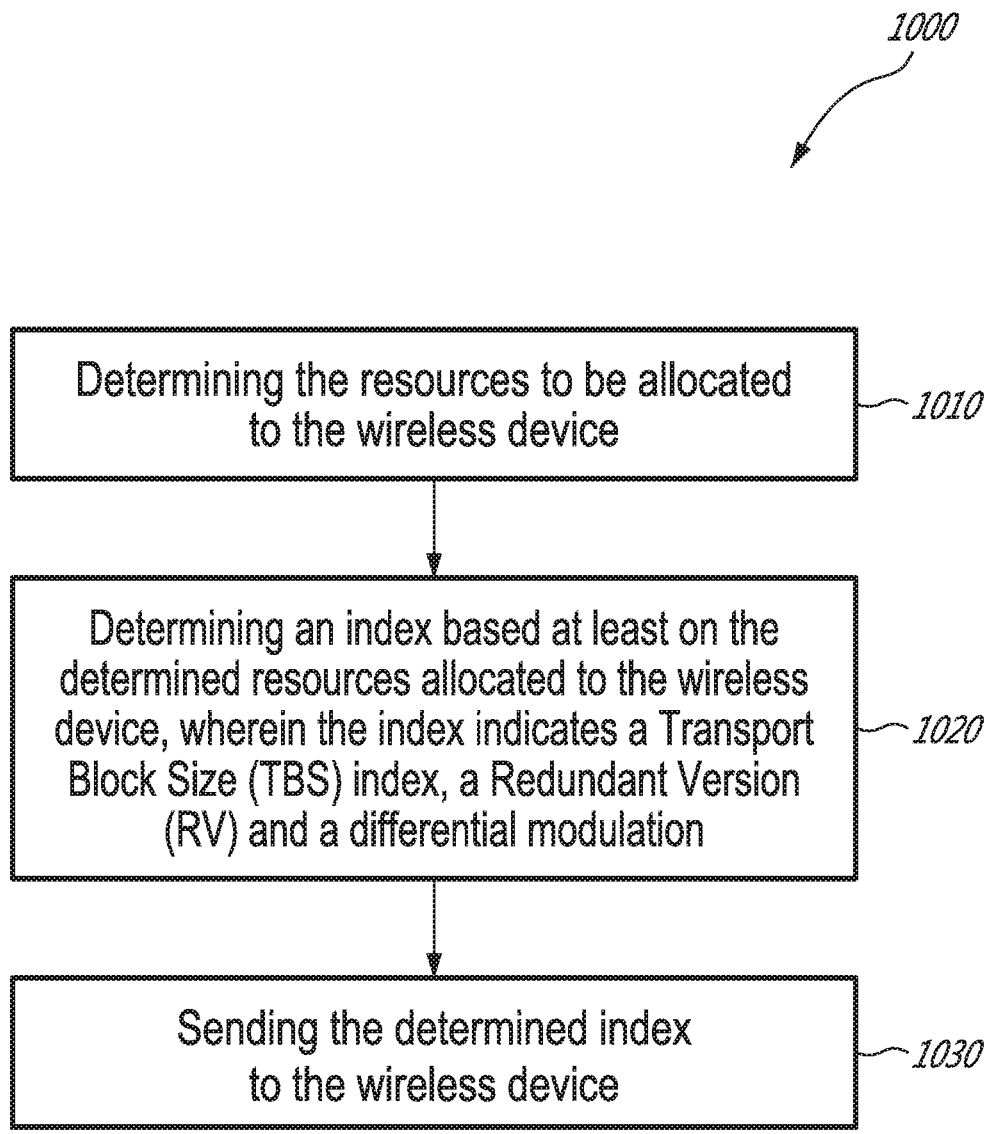
FIG. 10 is a flow chart of a method implemented in a network node in accordance with some embodiments.

FIG. 10 illustrates a flow chart of a method 1000 for allocating to a wireless device resources for a new transmission of user data, the user data having a first modulation order for a first group of layers and a second modulation order for a second group of layers. Method 1000 can be carried out by a network node, such as a base station or gNB 1100 of FIG. 11. Method 1000 comprises:

Determining the resources to be allocated to the wireless device (block 1010);

Determining an index based at least on the determined resources allocated to the wireless device, wherein the index indicates a Transport Block Size (TBS) index, a Redundant Version (RV) and a differential modulation (block 1020); and Sending the determined index to the wireless device (block 1030).

In some embodiments, the network node may further send an indication of the allocated resources to the wireless device.

In some embodiments, in block 1010, to determine the allocated resources, the network node performs the following steps (Step A):

Estimating, for each group of layers (e.g. group 0 and group 1) a UE's efficiency based on a UE reported Channel Quality Information CQI. To do so, the network node updates the UE's channel condition (e.g. SINR) based on the received UE CQI report for each group of layers.

Converting the SINR into a corresponding efficiency (bits/RE) and determining the modulation order $M_i$ with i=0, 1, using table 8, for example.

The network node allocates the resource blocks according to the efficiency.

In some embodiments, in block 1020, to determine the index, the network node performs the following steps:

Estimating a $TBS_i$ (i=0, 1) for each group of layers by multiplying the efficiency with the RE number in the allocated PRBs.

The network node further performs the following steps:

Step B—Calculating a total TBS such as total $TBS=L_0*TBS_0+L_1*TBS_1$, where $L_0$ corresponds to the number of layers of the first group (group 0) and $L_1$ corresponds to the number of layers of the second group (group 1). And calculating the differential modulation order (DMO) such as $DMO=M_1-M_0$ (assume $M_1>=M_0$), Step C—Using the calculated total TBS to look up the TBS table (table 2) to get the closest quantized TBS (QTBS). The row index corresponding to the closest quantized TBS yields the index that will be used as the 7-bits joint index if a verification step (step E) is passed, as described below.

Step D—Recalculating the average efficiency $$\overline{\text{efficiency}} = \frac{QTBS}{(L_0 + L_1) \times RE}.$$

The calculated average efficiency and DMO are used to derive two modulation orders $M_0$ and $M_1$ using the sliding window algorithm, for example. If the two derived modulations are both the same as $M_0$ and $M_1$ as previously calculated (in step A), then go to step E, otherwise, repeat step A to try other modulation orders until all modulation orders have been verified.

Step E—The joint index scheme is different for a new transmission and a retransmission.

For a new transmission, the joint index is given by index=31*DMO+row index

For a retransmission, the joint index is given by index=127−[4*(offset−1)+DMO], where offset=1 for RV 1; 2 for RV 3; 3 for RV 2.

Once the index is determined, the network node sends the index to the wireless device, in a DCI signaling, for example.

In some embodiments, method 1000 may comprise determining a first TBS for the first group of layers and a second TBS for the second group of layers, based on the allocated resources. Then, the method 1000 can determine a total TBS based on the first TBS and second TBS.

In some embodiments, method 1000 may comprise looking up a 2-dimensional table of TB sizes and numbers of nominal Physical Resource Blocks (PRBs) to find a value of the TBS index corresponding to the determined total TBS and number of PRBs.

In some embodiments, method 1000 may comprise determining a first modulation order for the first group of layers and a second modulation order for the second group of layers.

In some embodiments, method 1000 may comprise determining the differential modulation based on the first modulation order and the second modulation order.

In some embodiments, method 1000 may comprise validating the determined first and second modulation orders by recalculating an average efficiency.

FIG. 11 illustrates an exemplary network node (or base station) 1100 according to an embodiment. The network node 1100 is configured to perform method 1000 of FIG. 10, for example. The network node 1100 may comprise a first determining module 1110, a second determining module 1120, and a sending module 1130.

The first determining module 1110 is configured to perform at least block 1010 of method 1000. The second determining module 1120 is configured to perform at least block 1020 of method 1000. The sending module 1130 is configured to perform at least block 1030 of method 1000.

Figure 12:
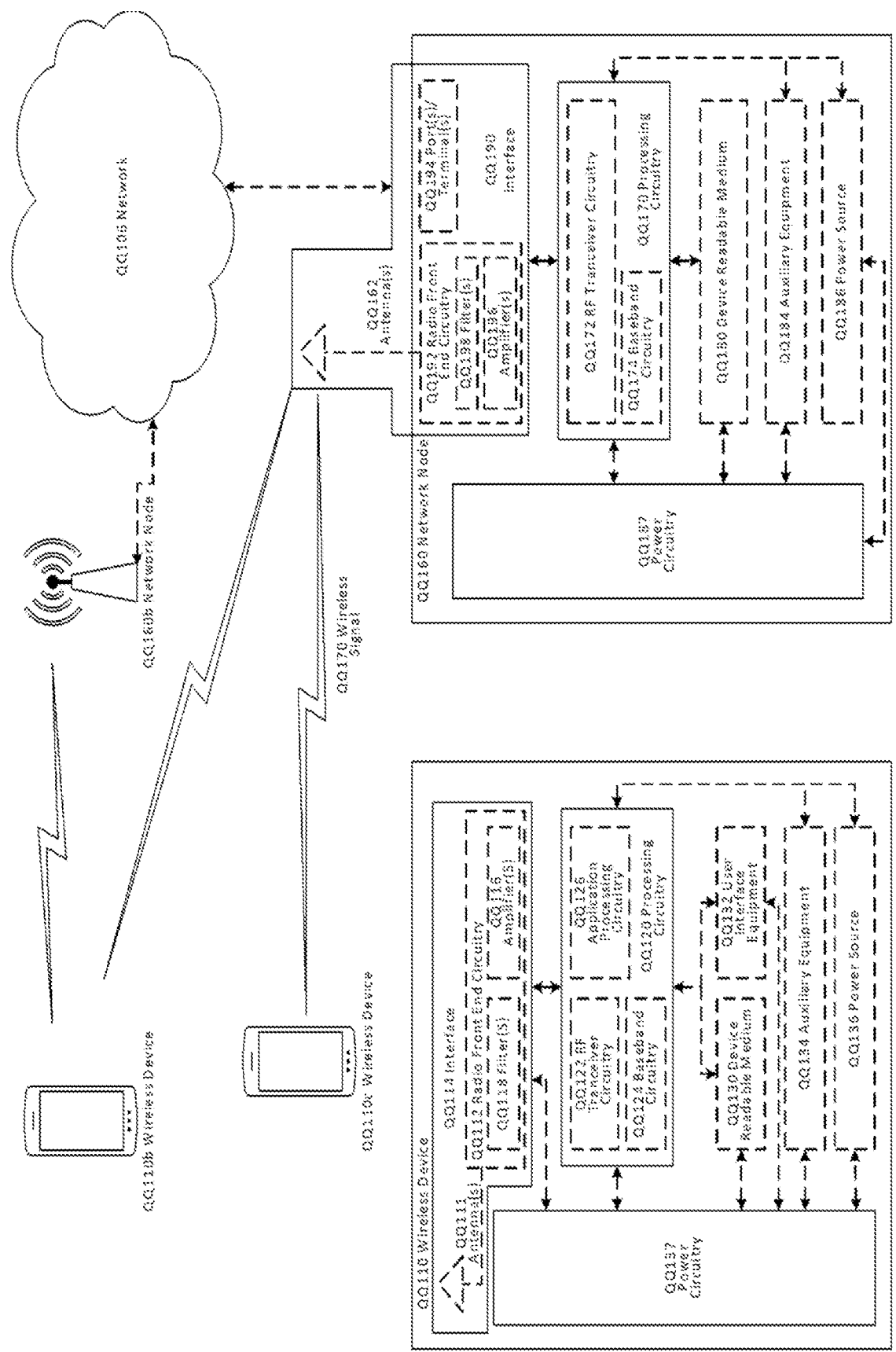
FIG. 12 is a block diagram of a wireless network.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network QQ106, network nodes QQ160 and QQ160b, and WDs QQ110, QQ110b, and QQ110c. The network nodes QQ160 may correspond to network nodes 1100, and the WDs QQ110 may correspond to wireless devices 900. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein, such as method 1000 of FIG. 10. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination. For example, processing circuitry QQ170 is configured to perform the operations of methods 300 and 500.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein (such as method 1000) as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc.

and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signaling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 12 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine-type communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal. The WD may refer to the wireless device 900 of FIG. 9.

As illustrated, wireless device QQ110 (or 900) includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein (such as method 800 of FIG. 8) as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination. For example, the processing circuitry QQ120 may be configured to perform the operations methods 200 and 400.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110 and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 13:
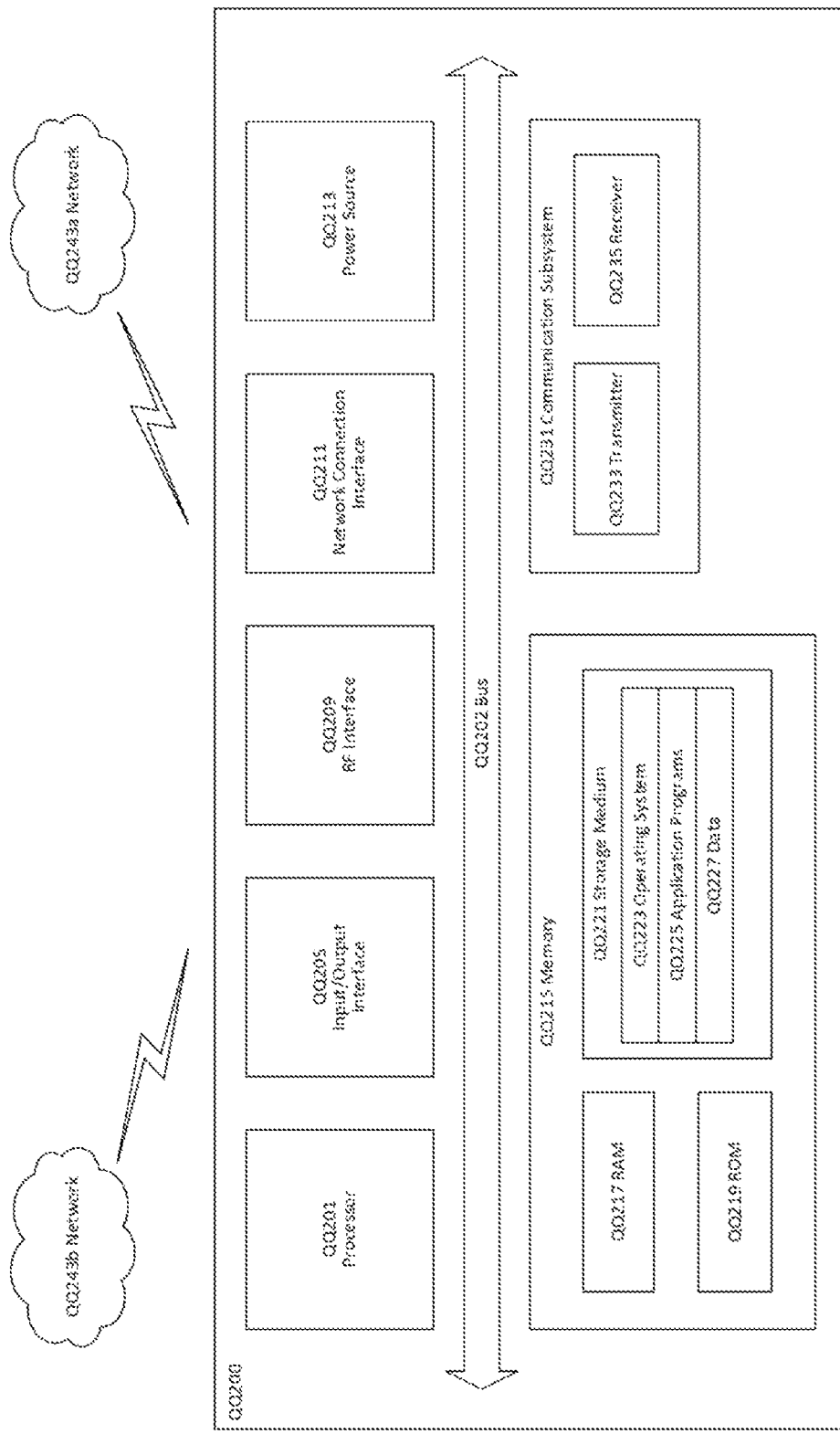
FIG. 13 is a block diagram of a UE in accordance with some embodiments.

FIG. 13 illustrates one embodiment of a UE, such as the wireless device 900, in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user. A UE may also comprise any UE identified by the 3$^{rd}$ Generation Partnership Project (3GPP), including a NB-IoT UE that is not intended for sale to, or operation by, a human user. UE QQ200, as illustrated in FIG. 13, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 13 QQ2, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor In FIG. 13, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 13, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243*b* may encompass wired and/or wireless networks such as a local-area network (LAN), a wide-area network (WAN), a computer network, a wireless network, a telecommunications network, another like network or any combination thereof. For example, network QQ243*b* may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 14:
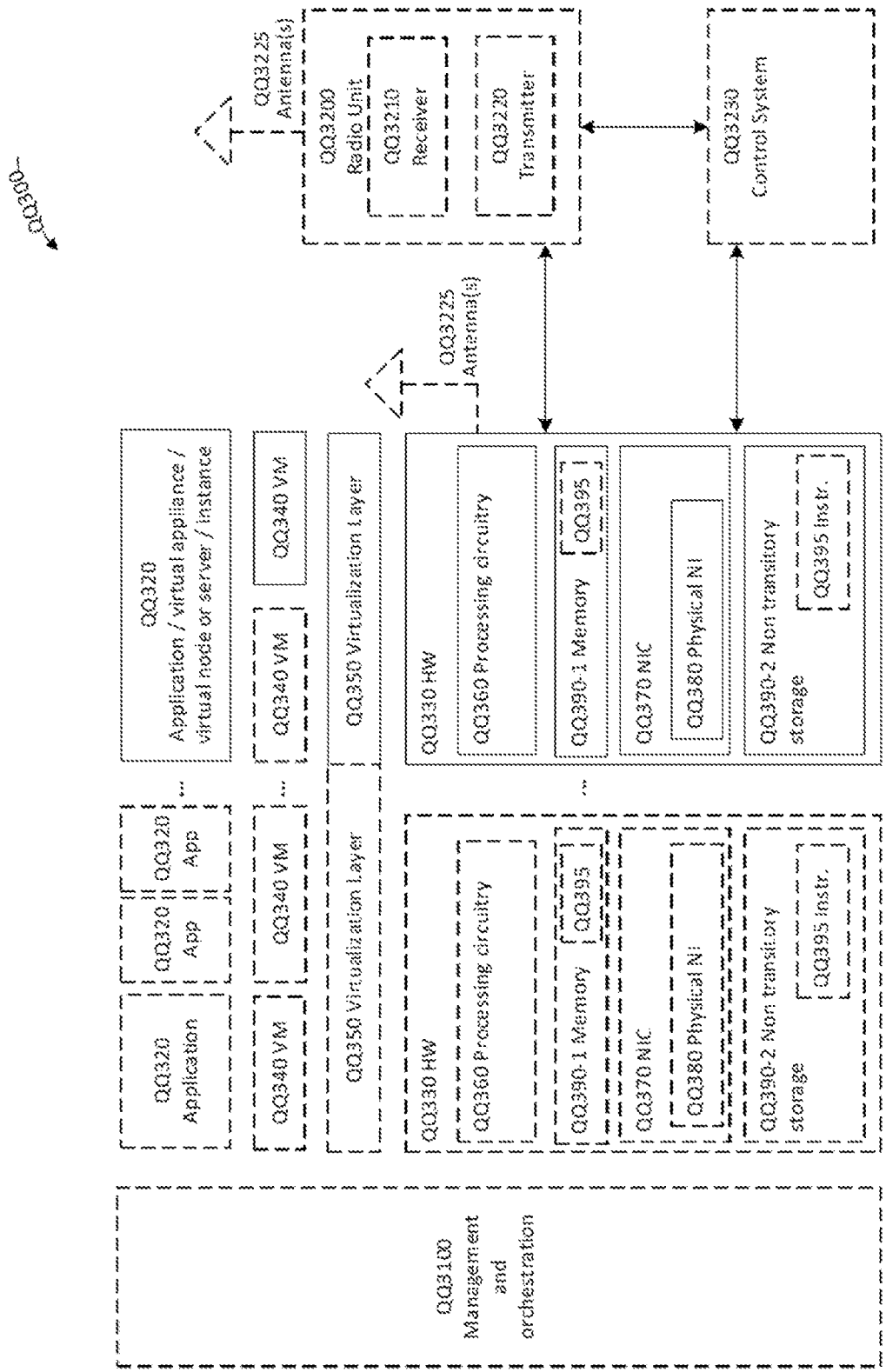
FIG. 14 is a schematic block diagram of a virtualization environment.

FIG. 14 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node, such as network nodes 1100 and QQ160 (e.g., a virtualized base station or a virtualized radio access node) or to a device such as wireless devices 900 and QQ110 (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 14, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 14.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 15:
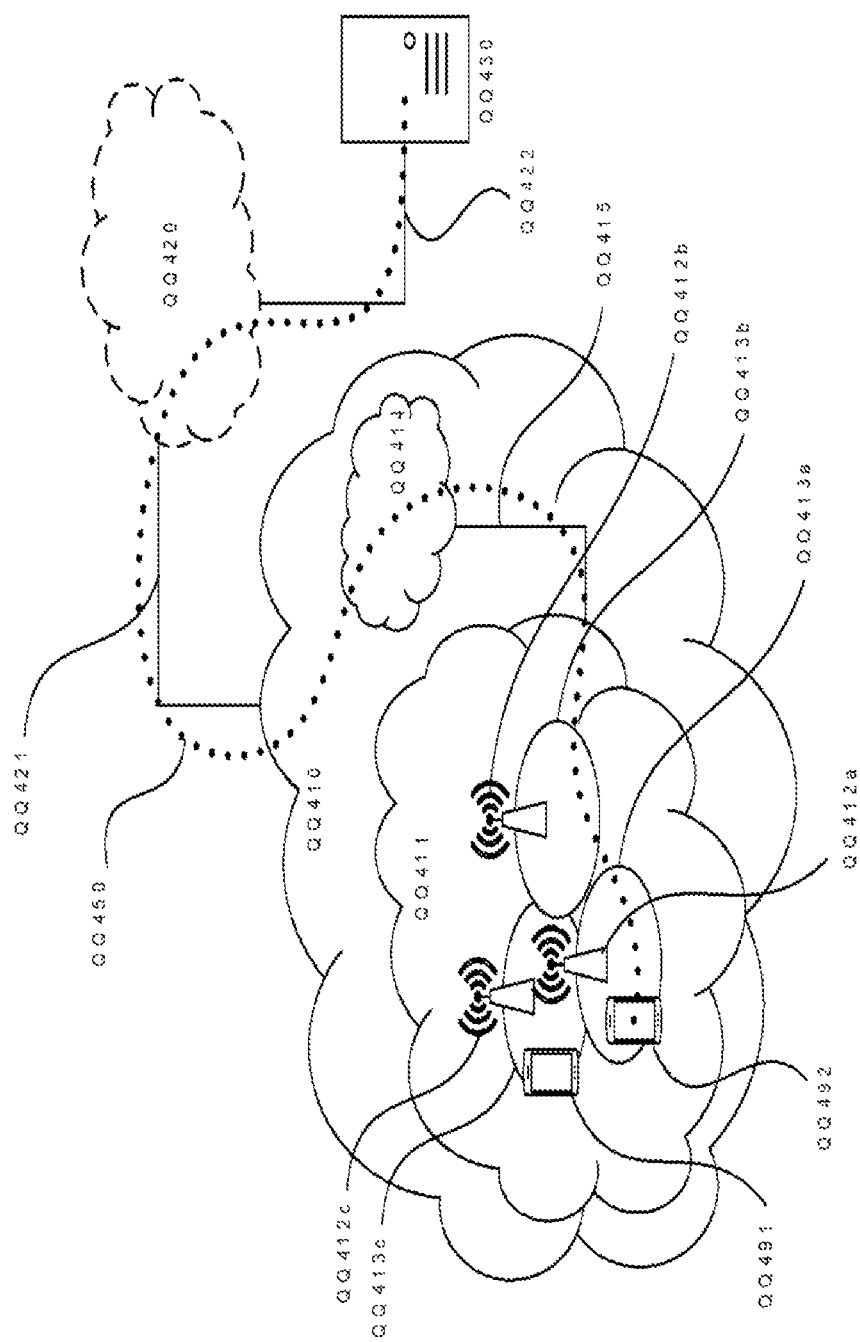
FIG. 15 is a schematic block diagram of a communication system.

With reference to FIG. 15, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs (such as QQ160 or 1100) or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 (corresponding to QQ110 or 900) located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 15 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Please replace paragraph with the following amended paragraph:

Example implementations, in accordance with an embodiment, of the UE, base station and host computer discussed in the preceding paragraphs will now be described with reference to FIG. 16 QQ5. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 16) served by base station QQ520. Communication interface QQ526 may be configured to facilitate connection QQ560 to host computer QQ510. Connection QQ560 may be direct or it may pass through a core network (not shown in FIG. 16) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 16:
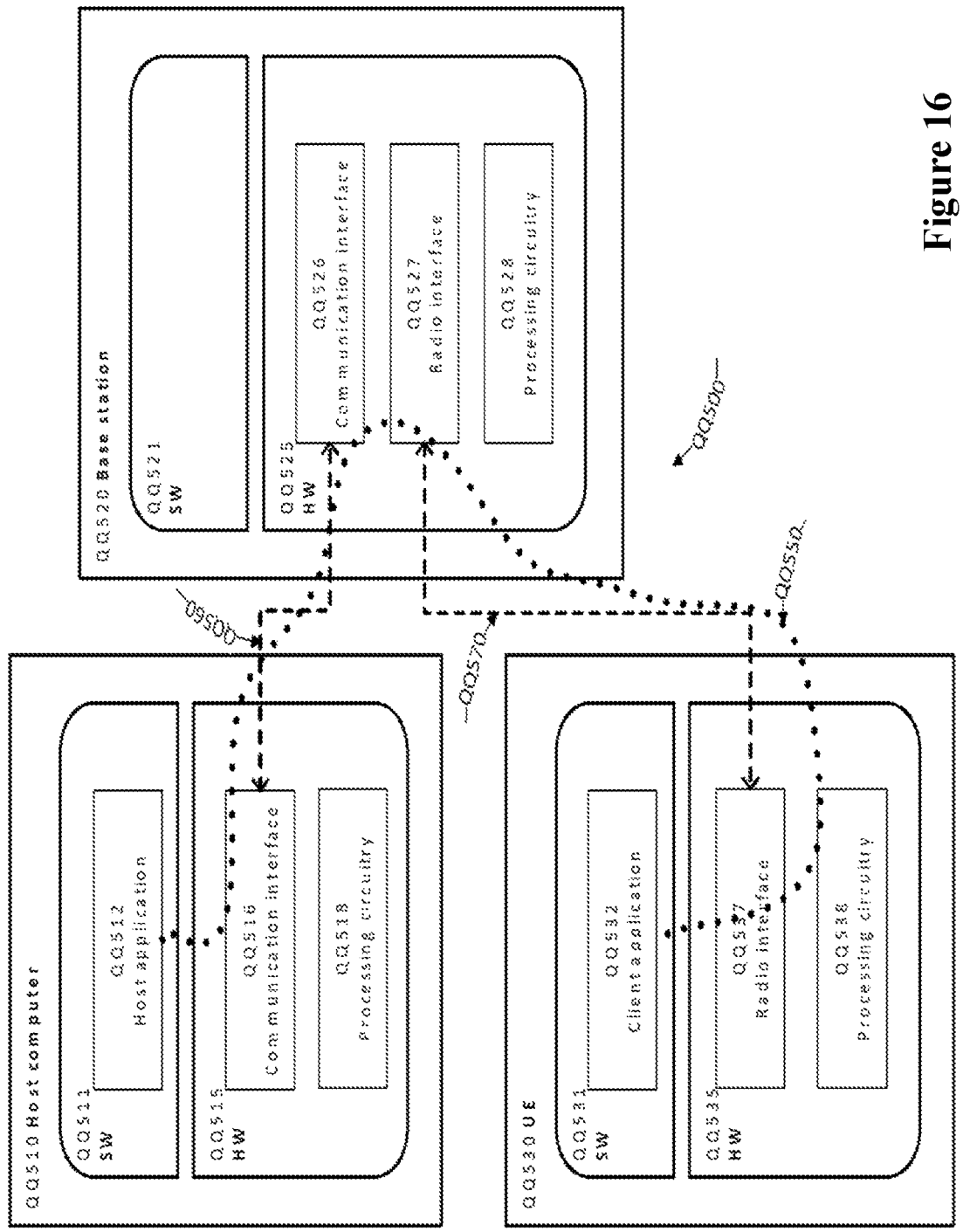
FIG. 16 is a schematic block diagram of a communication system with a host computer.

It is noted that host computer QQ510, base station QQ520 and UE QQ530 illustrated in FIG. 16 may be similar or identical to host computer QQ430, one of base stations QQ412a, QQ412b, QQ412c and one of UEs QQ491, QQ492 of FIG. 15, respectively. This is to say, the inner workings of these entities may be as shown in FIG. 16 QQ5 and independently, the surrounding network topology may be that of FIG. 15.

In FIG. 16, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities.

The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figures 17, 18:
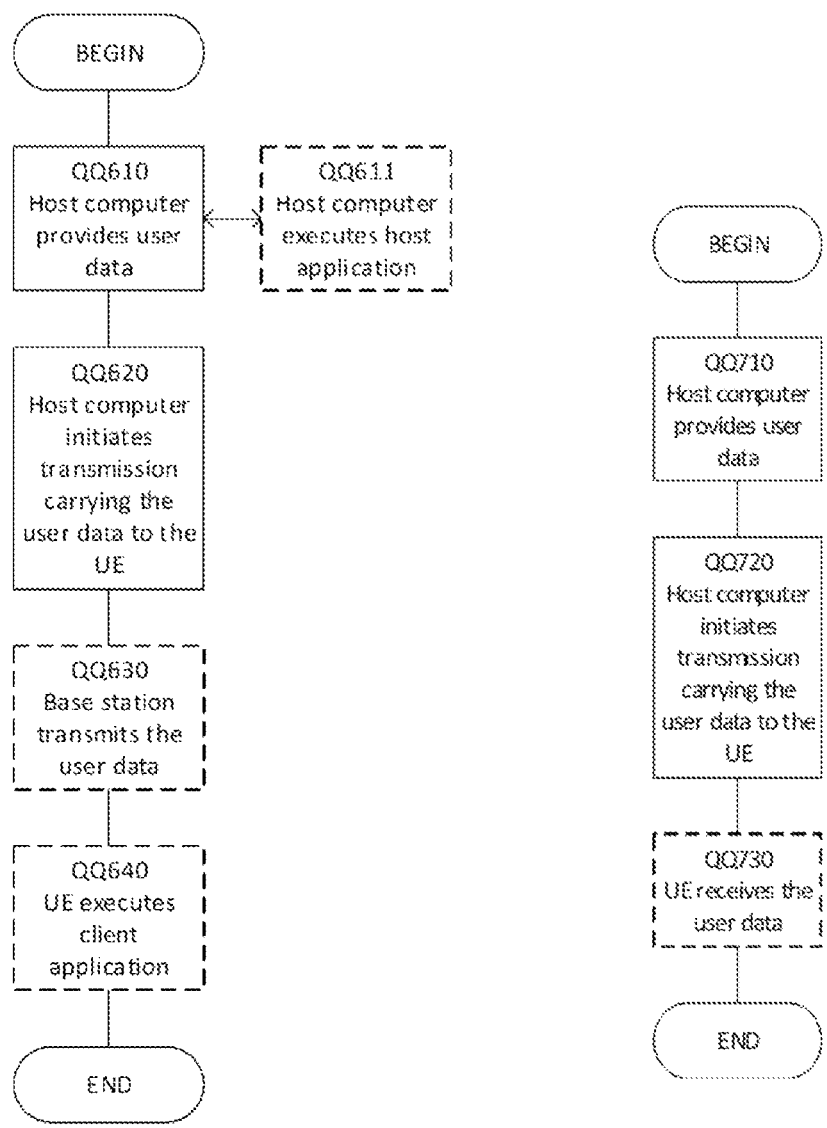
FIG. 17 is a flowchart illustrating a method implemented in a communication system, in accordance with one embodiment.
FIG. 18 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figures 19, 20:
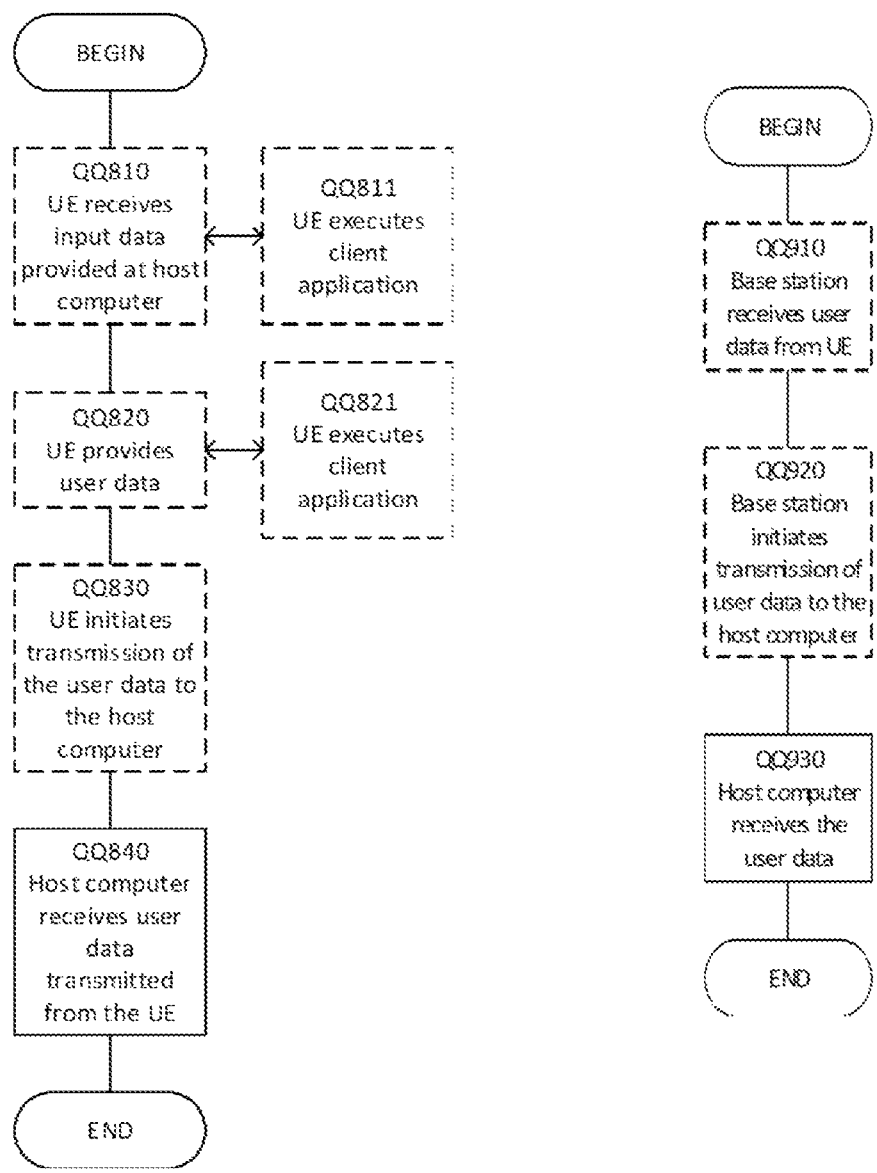
FIG. 19 is a flowchart illustrating a method implemented in a communication system, in accordance with one embodiment.
FIG. 20 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The above-described embodiments are intended to be examples only. Alterations, modifications and variations may be effected to the particular embodiments by those of skill in the art without departing from the scope of the description, which is defined solely by the appended claims.

ABBREVIATION

3GPP Third Generation Partnership Project
E-UTRA Evolved UTRA
QPSK Quadrature Phase Shift Keying
QAM Quadrature Amplitude Modulation
UTRA Universal Terrestrial Radio Access

What is claimed is:

1. A method performed by a wireless device for handling user data, wherein the user data are converted into codewords, each codeword having a first group of layers and a second group of layers, the method comprising:
receiving an index from a network node, the index indicating a Transport Block Size (TB S) index, a Redundant Version (RV) and a differential modulation, wherein the differential modulation indicates a difference of modulation orders between the first and second groups of layers in a transport block;
determining a TBS based on the received index;
determining a redundant version value based on the received index;
determining a first modulation order for the first group of layers and a second modulation order for the second group of layers of a codeword, based at least on the differential modulation;
performing one of decoding and encoding the codeword based at least on the determined first and second modulation orders, the determined TBS and the determined redundant version value.

2. The method of claim 1, further comprising receiving an indication of resource blocks allocated to the wireless device.

3. The method of claim 1, wherein the index is 7 bit-long.

4. The method of claim 3, wherein values [0-123] of the index indicate a TB size and modulation orders for a new transmission with a redundant version value equaling 0, values [116-127] of the index indicate different redundant version values and modulation orders for a retransmission, and values [116-123] of the index are overlapped values shared by both the new transmission and retransmission.

5. The method of claim 1, wherein the differential modulation indicates a difference of modulation orders between the first and second groups of layers.

6. The method of claim 5, wherein the differential modulation of zero indicates that the first and second groups have a same modulation order; wherein the differential modulation of one indicates that a modulation order difference between the first and second groups is one, wherein the differential modulation of two indicates that a modulation order difference between the first and second groups is two, wherein the differential modulation of three indicates that a modulation order difference between the first and second groups is three.

7. The method of claim 1, further comprising determining a number of layers in each group of the codeword.

8. The method of claim 7, wherein determining the number of layers is determined based on a received demodulation reference signal (DMRS).

9. The method of claim 1, wherein the differential modulation is equal to zero, and wherein determining the first and second modulations comprises:
determining a TBS based on the received TBS index and a nominal number of resource blocks;
determining a resource element (RE) efficiency based on the determined TBS and a number of REs in the allocated resource blocks; and
determining the first and second modulation orders based on the determined resource element efficiency.

10. The method of claim 1, wherein determining the first and second modulation orders comprises:
determining a TBS based on the received TBS index and a nominal number of resource blocks;
calculating an average efficiency between the first group and the second group based on the determined TBS; and
determining the first and second modulation orders based on the calculated average efficiency and a value of the differential modulation.

11. A wireless device for handling user data, wherein the user data are converted into codewords, each codeword having a first group of layers and a second group of layers, the wireless device comprising:
a communication interface configured to communicate with other nodes;
processing circuitry configured:
receive an index from a network node, the index indicating a Transport Block Size (TBS) index, a Redundant Version (RV) and a differential modulation;
determine a TBS based on the received index;
determine a redundant version value based on the received index;
determine a first modulation order for the first group of layers and a second modulation order for the second group of layers of a codeword, based at least on the differential modulation;
perform one of decoding and encoding the codeword based at least on the determined first and second modulation orders, the determined TBS and the determined redundant version value; and power supply circuitry configured to supply power to the wireless device.

12. A method performed by a base station for allocating resources for a transmission of user data to a wireless device, the user data being converted into a codeword having a first group of layers and a second group of layers, the method comprising:
   determining the resources to be allocated to the wireless device;
   determining an index based at least on the determined resources allocated to the wireless device, wherein the index indicates a Transport Block Size (TBS) index, a Redundant Version (RV) and a differential modulation, wherein the differential modulation indicates a difference of modulation orders between the first and second groups of layers in a transport block; and
   sending the determined index to the wireless device.

13. The method of claim 12, further comprising sending an indication of the allocated resources to the wireless device.

14. The method of claim 13, further comprising determining a first modulation order for the first group of layers and a second modulation order for the second group of layers.

15. The method of claim 14, further comprising determining the differential modulation based on the first modulation order and the second modulation order.

16. The method of claim 14, further comprising validating the determined first and second modulation orders by recalculating an average efficiency based at least on the determined quantized TBS and numbers of nominal PRB.

17. The method of claim 12, further comprising determining a first TBS for the first group of layers and a second TBS for the second group of layers, based on the allocated resources.

18. The method of claim 17, further comprising determining a total TBS based on the first TBS and second TBS.

19. The method of claim 18, further comprising looking up a 2-dimensional table of TB sizes using numbers of nominal Physical Resource Blocks (PRBs) to find a value of quantized TBS closest to the determined total TBS.

20. A network node for allocating resources for a transmission from a wireless device, the base station comprising:
   a communication interface configured to communicate with other nodes;
   processing circuitry configured to:
      determine the resources to be allocated to the wireless device;
      determine an index based at least on the determined resources allocated to the wireless device, wherein the index indicates a Transport Block Size (TBS) index, a Redundant Version (RV) and a differential modulation ; and
   send the determined index to the wireless device; and
   power supply circuitry configured to supply power to the base station.

* * * * *

UNITED STATES PATENT AND TRADEMARK OFFICE
CERTIFICATE OF CORRECTION

PATENT NO.          : 11,419,005 B2  
APPLICATION NO.     : 16/620176  
DATED               : August 16, 2022  
INVENTOR(S)         : Xixian Chen, Jun Wang and James Jianfeng Weng Page 1 of 1

It is certified that error appears in the above-identified patent and that said Letters Patent is hereby corrected as shown below:

On the Title Page

"(22) PCT Filed: Jun. 6 2018"  
Should read:  
-- (22) PCT Filed: Jun. 13 2018 --

Signed and Sealed this
Twenty-third Day of May, 2023

Katherine Kelly Vidal  
*Director of the United States Patent and Trademark Office*